(12) United States Patent
Han et al.

(10) Patent No.: US 12,438,411 B2
(45) Date of Patent: Oct. 7, 2025

(54) MAGNETIC FLUID SEALED SHAFT ASSEMBLY, SHIELDED MOTOR, AND SHIELDED PUMP

(71) Applicant: Shenyang Anti-Corrosion Alloy Pump CO., LTD., Shenyang (CN)

(72) Inventors: Jie Han, Shenyang (CN); Ailiang Han, Shenyang (CN); Yutong Wang, Shenyang (CN)

(73) Assignee: SHENYANG ANTI-CORROSION ALLOY PUMP CO., LTD., Shenyang (CN)

( * ) Notice: Subject to any disclaimer, the term of this patent is extended or adjusted under 35 U.S.C. 154(b) by 171 days.

(21) Appl. No.: 18/269,618

(22) PCT Filed: Dec. 23, 2021

(86) PCT No.: PCT/CN2021/140769
§ 371 (c)(1),
(2) Date: Jun. 26, 2023

(87) PCT Pub. No.: WO2022/135512
PCT Pub. Date: Jun. 30, 2022

(65) Prior Publication Data
US 2024/0063681 A1  Feb. 22, 2024

(30) Foreign Application Priority Data

Dec. 25, 2020  (CN) .......................... 202011559309.6
Dec. 17, 2021  (CN) .......................... 202111554050.0

(51) Int. Cl.
*H02K 5/124* (2006.01)
*F04D 29/10* (2006.01)
*F16J 15/43* (2006.01)

(52) U.S. Cl.
CPC ............. *H02K 5/124* (2013.01); *F04D 29/10* (2013.01); *F16J 15/43* (2013.01)

(58) Field of Classification Search
CPC .......... F16J 15/43; F04D 29/10; H02K 5/124
See application file for complete search history.

(56) References Cited

U.S. PATENT DOCUMENTS

| 4,171,818 A | 10/1979 | Moskowitz et al. |
| 4,995,622 A * | 2/1991 | Fuse ........................ F16J 15/43 |
| | | 277/410 |

(Continued)

FOREIGN PATENT DOCUMENTS

| CN | 211606263 U | * | 9/2020 |
| CN | 212003703 U | | 11/2020 |

(Continued)

*Primary Examiner* — Eugene G Byrd
(74) *Attorney, Agent, or Firm* — Bayramoglu Law Offices LLC

(57) ABSTRACT

A magnetic fluid sealed shaft assembly, a shielded motor, and a shielded pump, wherein the shaft assembly comprises: a housing provided with an accommodating cavity, the accommodating cavity being provided with a fixed structure on an inner wall; a rotating shaft supported and mounted in the accommodating cavity; a magnetic fluid sealing device which is located in the accommodating cavity and sleeves and is sealedly and fixedly mounted on the rotating shaft, wherein space is reserved in the housing for runout of the magnetic fluid sealing device following the rotating shaft and/or adjustment of a mounting angle and position; and a resilient member which is sealedly mounted on an outer sleeve of the magnetic fluid sealing device and sealedly connected to the fixed structure. This structure eliminates the additional axial force, radial force, external torsion, statically indeterminate force, etc., on the bearings in the magnetic fluid sealing device during operation.

18 Claims, 11 Drawing Sheets

(56) References Cited

U.S. PATENT DOCUMENTS

| | | | | |
|---|---|---|---|---|
| 5,263,825 | A * | 11/1993 | Doolin | F04D 29/108 417/423.1 |
| 11,193,592 | B1 * | 12/2021 | Li | F16C 33/765 |
| 2005/0063843 | A1 * | 3/2005 | Walker | F04D 7/06 417/423.3 |
| 2005/0152780 | A1 * | 7/2005 | Quill | F04D 29/106 415/206 |
| 2013/0019827 | A1 | 1/2013 | Oka et al. | |
| 2013/0057116 | A1 * | 3/2013 | Kino | H02K 5/124 384/446 |
| 2017/0104383 | A1 * | 4/2017 | Fujisaki | H02K 5/16 |
| 2022/0003318 | A1 * | 1/2022 | Brushkivskyy | H02K 5/124 |

FOREIGN PATENT DOCUMENTS

| | | | |
|---|---|---|---|
| CN | 215521975 U | | 1/2022 |
| GB | 959073 A | | 5/1964 |
| JP | 2591965 Y2 | * | 6/1993 |

* cited by examiner

MAGNETIC FLUID SEALED SHAFT ASSEMBLY, SHIELDED MOTOR, AND SHIELDED PUMP

CROSS-REFERENCES TO THE RELATED APPLICATIONS

This application is the national phase entry of International Application No. PCT/CN2021/140769, filed on Dec. 23, 2021, which is based upon and claims priority to Chinese Patent Application No. 202011559309.6, filed on Dec. 25, 2020 and Chinese Patent Application No. 202111554050.0, filed on Dec. 17, 2021, the entire contents of which are incorporated herein by reference.

TECHNICAL FIELD

The present invention relates to the technical field of shaft sealing, and specifically to a magnetic fluid sealed shaft assembly, a shielded motor, and a shielded pump.

BACKGROUND

Magnetic fluid sealing technology is a new sealing approach, which refers to the use of magnetic fluid with high saturation magnetization to seal the relevant mechanical equipment, and magnetic fluid sealing is a kind of zero-leakage dynamic sealing with excellent sealing effect. However, in the process of sealing the rotating shafts of non-precision products such as fans, valves, turbines, and pumps with magnetic fluid sealing devices, it has been found that the magnetic fluid sealing devices are very susceptible to damage after a period of use. The reason for this is that, when in use, the magnetic fluid sealing device needs to be mounted on the rotating shaft as well as being fixed to the fixed structure on the housing outside the rotating shaft, while the magnetic fluid sealing device itself is a precision part, so the mounting and use of the magnetic fluid sealing device requires a high degree of precision in terms of perpendicularity and coaxiality between the rotating shaft and the fixed structure, as well as the radial runout of the rotating shaft. Therefore, if the precision requirements for mounting and use are not met when the magnetic fluid sealing device is mounted and machined, the service life of the magnetic fluid sealing device will be greatly reduced, even leading to direct damage to the magnetic fluid sealing device. For fans, valves, turbines, pumps, and other non-precision products, their mounting precision and the machining precision of their parts often fail to meet the precision requirements required by magnetic fluid sealing devices, which prevents the direct application of magnetic fluid sealing devices to fans, valves, turbines, pumps, and other products.

Therefore, how to enable the magnetic fluid sealing devices to be applied to fans, valves, turbines, pumps, and other products, and to ensure the service life of magnetic fluid sealing devices in fans, valves, turbines, pumps, and other products has become an urgent problem to be solved.

SUMMARY

The present invention is intended to provide a magnetic fluid sealed shaft assembly in order to address at least one of the problems raised in the background above.

The present invention further provides a shielded motor and a shielded pump including the aforementioned magnetic fluid sealed shaft assembly.

To achieve the above purpose, a first aspect of the present invention provides a magnetic fluid sealed shaft assembly, comprising: a housing in which an accommodating cavity is provided, the accommodating cavity being provided with a fixed structure on an inner wall, a rotating shaft supported and mounted in the accommodating cavity; a magnetic fluid sealing device which is located in the accommodating cavity and is sleeve mounted on the rotating shaft, wherein the housing is provided with space for runout of the magnetic fluid sealing device following the rotating shaft and/or adjustment of a mounting angle and position according to a mounting state of the rotating shaft; and a resilient member which is hermetically connected to both the magnetic fluid sealing device and the fixed structure, wherein after the magnetic fluid sealing device is resiliently and hermetically connected to the fixed structure by the resilient member, the magnetic fluid sealing device is capable of runout following the rotating shaft and/or adjustment of the mounting angle and position according to the mounting state of the rotating shaft, thus avoiding conflicts between the magnetic fluid sealing device and the fixed structure. Here, the resilient member is preferably made of a non-metallic material with a certain resilience, tensile strength, fatigue strength, etc., which meets working conditions.

Further, an outer gas blockage cavity is provided inside the housing and below the magnetic fluid sealing device, and the outer gas blockage cavity is capable of forming a gas blockage after the bottom of the housing is sealed, i.e., when the magnetic fluid sealed shaft assembly is in operation.

In the above technical solution, preferably, the magnetic fluid sealed shaft assembly is of a vertical structure.

Even further, the magnetic fluid sealed shaft assembly is of a vertical structure. Further, the housing comprises a first casing and a second casing sealedly connected to each other, wherein a shaft via hole is provided at the joint of the first casing and the second casing, the rotating shaft extends from the inside of the first casing into the second casing and extends out from the bottom of the second casing, and the magnetic fluid sealing device is mounted at the shaft via hole by means of the resilient member for use in sealing the shaft via hole. An outer gas blockage cavity is provided inside the second casing and below the magnetic fluid sealing device, and the outer gas blockage cavity is capable of forming a gas blockage after the bottom of the second casing is sealed. Further, gas required to form the gas blockage is natural air in the second casing in the outer gas blockage cavity, or the magnetic fluid sealed shaft assembly further comprises a gas inlet passage, where one end of the gas inlet passage is communicated with the interior of the second casing in the outer gas blockage cavity and the other end of the gas inlet passage is communicated with a gas source, and gas required to form the gas blockage comprises natural air in the second casing in the outer gas blockage cavity and gas input from the gas inlet passage.

Further, the magnetic fluid sealed shaft assembly further comprises a bearing body assembly for supporting and mounting the rotating shaft, the bearing body assembly being mounted in the housing and located on the upper side or the lower side of the magnetic fluid sealing device, wherein the lower boundary of the formed gas blockage is located on the lower side of the magnetic fluid sealing device and the bearing body assembly.

Further, a lower end portion of the magnetic fluid sealing device is resiliently connected to the fixed structure by the resilient member, or an upper end portion of the magnetic fluid sealing device is resiliently connected to the fixed structure by the resilient member.

Further, the magnetic fluid sealed shaft assembly further comprises a waterproof protection device, which is mounted on the rotating shaft, provided near the bottom of the casing, and located on the lower side of the magnetic fluid sealing device and the bearing body assembly. With the waterproof protection device, liquids such as water under the rotating shaft are primarily blocked, thus preventing the liquids such as water under the rotating shaft from directly impacting on the magnetic fluid sealing device.

Preferably, the waterproof protection device comprises: a water retaining device, which is mounted on the rotating shaft and is located at the opening at the bottom of the casing, and a water pressing sleeve, which is mounted on the rotating shaft and is located on the side of the water retaining device away from the magnetic fluid sealing device, and which is provided with water pressing threads on the outer side wall of the sleeve.

In the above technical solution, preferably, the fixed structure is provided on an inner side wall of the housing, or the fixed structure is mounted on an end portion structure located on the housing. Specifically, the fixed structure may be a boss provided on the inner side wall of the housing, or the fixed structure is mounted on a barrel-shaped structure located at an end portion structure of the housing. Where the housing comprises a first casing and a second casing which are axially detachable and sealedly connected, the fixed structure is preferably provided at the joint of the first casing and the second casing.

In the above technical solution, preferably, a radial spacing is provided between the magnetic fluid sealing device and the fixed structure, and an axial spacing is provided between the housing and two ends of the magnetic fluid sealing device.

In the above technical solution, preferably, the resilient member is a resilient connecting barrel, and the resilient connecting barrel comprises a sleeve part and a mounting part, the sleeve part sleeving and being mounted on the magnetic fluid sealing device, and the mounting part being provided on the resilient sleeve and sealedly and fixedly connected to the fixed structure, wherein the sleeve part and the mounting part are of a one-piece structure, a radial spacing is provided between the sleeve part and the fixed structure, and an axial spacing is provided between the housing and two ends of the magnetic fluid sealing device.

Preferably, the sleeve part and the mounting part are made of materials that are capable of meeting the preset strength and resilience requirements. The mounting part is an annular retaining ring provided on an outer side wall of the sleeve part along the circumferential direction of the sleeve part.

In a specific solution, the annular retaining ring is located at a middle position of the sleeve part and is connected to the fixed structure by screws, and two ends of the sleeve part fixedly sleeve the magnetic fluid sealing device by at least two fastening members.

In another specific solution, the annular retaining ring is provided at an end portion position of the sleeve part and is connected to the fixed structure by screws, and the other end portion position of the sleeve part is provided with an underpinning mounting part protruding inward from an inner side wall of the sleeve part, the underpinning mounting part being fixedly mounted to an end face of the magnetic fluid sealing device by screws, and the annular retaining ring, the sleeve part, and the underpinning mounting part being of a one-piece structure, and the underpinning mounting part being provided with a through hole for the rotating shaft to pass through. Even further, a cushion pad is provided between the end of the magnetic fluid sealing device away from the underpinning mounting part and the housing. With this cushion pad, space can be reserved for the runout of the magnetic fluid sealing device along the axial direction.

In a preferred technical solution, the magnetic fluid sealing device is provided with at least one mating structure that is mounted in a mating manner to the fixed structure, and the resilient member comprises a first resilient ring provided between the at least one mating structure and the fixed structure and/or a second resilient ring located on the side of the mating structure away from the fixed structure, wherein the fixed structure, the at least one mating structure, the first resilient ring and/or the second resilient ring are secured by a fastener, and after the fixed structure, the at least one mating structure, the first resilient ring and/or the second resilient ring are secured by the fastener, the at least one mating structure is resiliently connected to the fixed structure so that the magnetic fluid sealing device is capable of runout following the rotating shaft and/or adjustment of the mounting angle and position according to the mounting state of the rotating shaft, that is, the magnetic fluid sealing device is capable of runout along the axial direction of the rotating shaft relative to the fixed structure or of inclined rotation relative to the rotating shaft.

Among them, the mating structure is preferably of a flange structure and the mating structure may be an annular structure provided along the circumferential direction of the magnetic fluid sealing device, the annular structure being provided with a plurality of mounting holes, or the mating structure may be a plurality and provided at intervals along the circumferential direction of the magnetic fluid sealing device, wherein the plurality of mating structures may all be shaped as projections or mounting plates with mounting holes. The first resilient ring and/or the second resilient ring may be rubber ring or silicone ring, and the like. Of course, the first resilient ring and/or the second resilient ring may also be of other structures capable of compression deformation. The fastener is preferably a bolt or screw. During mounting, it is necessary to perform a certain preloaded compression of the first resilient ring and/or the second resilient ring by the fastener, and at the same time it is necessary to ensure that the first resilient ring and/or the second resilient ring still have a sufficient amount of deformation after being well preloaded and compressed by the fastener, so that the fixed structure and the mating structure remain elastically connected, thereby allowing the mating structure to move with the magnetic fluid sealing device as a whole.

Further, the magnetic fluid sealed shaft assembly further comprises: an inner gas blockage hood, wherein the inner gas blockage hood is mounted in the outer gas blockage cavity and hermetically connected to a lower end of the magnetic fluid sealing device along the axial direction, and the inner gas blockage hood is provided around the outer side of a part of the rotating shaft that extends into the outer gas blockage cavity, an inner gas blockage cavity is formed between the inner gas blockage hood and the rotating shaft, and after the bottom of the housing is sealed, i.e., when the magnetic fluid sealing device is in operation, the inner gas blockage cavity is capable of forming a gas blockage.

Even further, an upper end of the inner gas blockage hood is provided with a mounting plate, and the resilient member is partially clamped and mounted between the mounting plate and a lower end portion of the magnetic fluid sealing device, or the resilient member is partially clamped and mounted between the mounting plate and the fixed structure.

Further preferably, the magnetic fluid sealing device comprises a magnetic fluid sealing member as well as a fixed sleeve that is provided outside the magnetic fluid sealing member, wherein a mating structure such as a flange structure is provided around the fixed sleeve, and is preferably of a one-piece structure with the fixed sleeve.

In a further solution, a radial spacing is provided between the fixed structure and the magnetic fluid sealing device, and the resilient member is a resilient connecting ring, a part of the resilient connecting ring being fixedly mounted on a first end portion of the magnetic fluid sealing device and the other part of the resilient connecting ring being fixedly mounted on the fixed structure; and a positioning structure is provided inside the housing and corresponding to a second end portion of the magnetic fluid sealing device, a cushion pad being provided between the positioning structure and the second end portion of the magnetic fluid sealing device.

Further, the fixed structure is a barrel-shaped structure that is mounted on an inner wall of the housing and is provided in the axial direction, the magnetic fluid sealing device is located inside the barrel-shaped structure and is provided with a radial spacing from the barrel-shaped structure, an inner side part of the resilient connecting ring is fixedly mounted on an end face of a first end of the magnetic fluid sealing device, and an outer side part of the resilient connecting ring is fixedly mounted on an end face of the barrel-shaped structure that corresponds to the end face of the first end of the magnetic fluid sealing device.

Even further, a sealed first cooling cavity is enclosed among the resilient connecting ring, the magnetic fluid sealing device, the barrel-shaped structure, and the cushion pad, and the magnetic fluid sealed shaft assembly further comprises a first cooling medium channel of which one end is sealedly communicated with the first cooling cavity, the other end of the first cooling medium channel being communicated with the outside of the housing.

In any of the above technical solutions, preferably, the magnetic fluid sealing device comprises: a fixed sleeve; a magnetic fluid sealing member, wherein the magnetic fluid sealing member is mounted in the fixed sleeve, and a sealed second cooling cavity is provided between an inner side wall of the fixed sleeve and an outer side wall of the magnetic fluid sealing member; and a second cooling medium channel, one end of the second cooling medium channel being communicated with the second cooling cavity and the other end of the second cooling medium channel being communicated with the outside of the housing, wherein the resilient member is sealedly mounted on the fixed sleeve and sealedly connected to the fixed structure.

Further preferably, the fixed sleeve is made of a metallic material.

Further preferably, the inner side wall of one end of the fixed sleeve is provided with a limit structure, and the other end of the fixed sleeve is mounted with a removable blocking member, where the magnetic fluid sealing member is mounted between the blocking member and the limit structure in a limit manner. Here, when the resilient member is a resilient connecting ring, the blocking member is preferably a part of the resilient connecting ring.

For the magnetic fluid sealed shaft assembly according to the present invention, during mounting, space is reserved in the housing for runout of the magnetic fluid sealing device together with the rotating shaft and/or for self-adjustment of the mounting angle and position by the magnetic fluid sealing device, while the magnetic fluid sealing device and the fixed structure of the housing are connected to each other by means of the resilient member. In this way, on the one hand, in the event of radial or axial runout of the rotating shaft, the magnetic fluid sealing device is capable of runout together with the rotating shaft, rather than being restricted by the housing and being incapable of runout together with the rotating shaft. On the other hand, the resilient connection between the magnetic fluid sealing device and the housing enables the magnetic fluid sealing device to automatically correct its own mounting angle based on the resilient deformation of the resilient member in the event of a large difference in the perpendicularity and coaxiality between the rotating shaft and the fixed structure, thus avoiding the phenomenon of inclined mounting of the magnetic fluid sealing device in the event of a large difference in the perpendicularity and coaxiality between the rotating shaft and the fixed structure, thereby enabling the magnetic fluid sealing device to self-correct its angle after inclined mounting. In summary, by reserving movement space for the magnetic fluid sealing device and by making the magnetic fluid sealing device and the housing to be resiliently connected to each other so that the magnetic fluid sealing device can dynamically correct and adjust its own mounting angle and/or mounting position according to the actual situation, the present application mitigates the influence of insufficient precision of the perpendicularity and coaxiality between the rotating shaft and the fixed structure as well as the radial runout of the rotating shaft. This avoids the interference and influence of the fixed structure on the housing on the magnetic fluid sealing device during the mounting and operating of the magnetic fluid sealed shaft assembly, reduces the fatigue damage of the magnetic fluid sealing device during the operation process, and eliminates the additional radial force, external torsion, statically indeterminate force, etc., on the bearings inside the magnetic fluid sealing device during the operation process, which allows the magnetic fluid sealing device to be applied in products with low precision, such as pumps, and ensures the service life of the magnetic fluid sealing device when it is applied to pump products, and reduces the failure rate of the magnetic fluid sealing device after it is applied to pump products, thereby ensuring the sealing effect of products such as fans, valves, turbines and pumps.

In addition, when used in vertical products such as vertical pumps, the magnetic fluid sealed shaft assembly of the present application, through the use of the magnetic fluid sealing device, provides the basis for the formation of a gas blockage in the lower end of the housing. This is because the absolute hermeticity of the magnetic fluid sealing within a certain pressure range is fundamental to the existence of the formation of a gas blockage cavity.

Further, the magnetic fluid sealing device comprises an inner sleeve and an outer sleeve, wherein the inner sleeve is fixed to the rotating shaft and the outer sleeve is connected to the fixed structure by a resilient member.

A second aspect of the present invention provides a shielded motor comprising a motor configuration assembly as well as a magnetic fluid sealed shaft assembly provided in any one of the embodiments of the first aspect, wherein a rotating shaft of the magnetic fluid sealed shaft assembly is used as a motor shaft of the shielded motor.

Further, the housing comprises a first casing and a second casing sealedly connected to each other, the first casing being a motor casing and the motor configuration assembly being provided in the first casing, wherein an output end of the motor shaft extends from the motor casing and is inserted into the second casing, and the magnetic fluid sealing device of the magnetic fluid sealed shaft assembly is mounted in the motor casing or in the second casing. Specifically, a shaft via hole is provided at the joint of the first casing and the second casing, the motor shaft extends from the inside of the motor casing into the second casing through the shaft via hole, and a shaft entry and exit hole is provided on the end of the second casing away from the first casing, the magnetic fluid sealing device is mounted at the shaft via hole by means of the resilient member for use in sealing the shaft via hole, and a bearing body assembly for supporting the motor shaft is also mounted at the shaft via hole, on the upper side or lower side of the magnetic fluid sealing device; and the motor configuration assembly is provided in the first casing for use in realizing motor functions. Specifically, the magnetic fluid sealing device may be mounted within the first casing serving as the motor casing and be made to be close to the shaft outlet of the motor casing, and a resilient ring may then be fixed to the outer end portion of the motor casing so that the magnetic fluid sealing device is resiliently connected to the motor casing.

Further, the shielded motor is a vertical motor, and after the end of the second casing away from the motor casing (first casing) is sealedly connected to the load equipment, a gas blockage can be formed therein.

The shielded motor provided according to the present invention comprises a motor configuration assembly as well as the magnetic fluid sealed shaft assembly as provided in any one of the embodiments of the first aspect, wherein during the mounting, the motor casing of the motor body can be sealedly connected to the second casing and the output end of the motor shaft can be inserted into the second casing via a shaft via hole at the joint of the motor body with the second casing. With this structure, the shielded motor is arranged in a structure like that of the magnetic fluid sealed shaft assembly provided in any one of the embodiments of the first aspect, enabling the shaft face sealing and shielding of the motor shaft, thus providing the beneficial effect of the magnetic fluid sealed shaft assembly provided in any one of the embodiments of the first aspect, which will not be repeated here.

Further, preferably, the magnetic fluid sealed shaft assembly further comprises a gas inlet passage in communication with the second casing and inputting gas into the second casing, wherein a gas blockage can be formed inside the second casing. When the shielded motor is connected to the pump, using the gas blockage, water in the pump can be prevented from entering the motor through the shaft entry and exit hole. The gas required to form the gas blockage can be either natural air in the second casing or gas input into the second casing via the gas inlet passage on the second casing. In this case, to facilitate the inputting of the external gas, a gas inlet passage can be provided on the second casing and one end of the gas inlet passage can be communicated with the interior of the lower end of the second casing and the other end of the gas inlet passage can be communicated with the gas source. A third aspect of the present invention provides a shielded pump, comprising a pump body and a shielded motor connected to each other, wherein the pump body comprises the magnetic fluid sealed shaft assembly as provided in any one of the embodiments of the first aspect, or the shielded motor is the shielded motor as provided in any one of the embodiments of the second aspect. Of course, the shielded motor may also be other motors with shielding functions, or ordinary motors.

The shielded pump provided according to embodiments of the present invention comprises a pump body and a shielded motor connected to each other, wherein in the case where the pump body comprises the magnetic fluid sealed shaft assembly as provided in any one of the embodiments of the first aspect, the pump may be a vertical pump such as a long-shaft submerged pump or a long-shaft deep well pump. In the case where the shielded motor is a shielded motor provided in any one of the embodiments of the second aspect, the pump body can be hermetically mounted directly to the end of the second casing away from the motor body, and the motor shaft can be connected to the rotating part of the pump body, so that the rotating part of the pump body can be driven by the motor shaft to operate. At the same time, a gas inlet passage for inputting gas into the second casing can be provided on the second casing, and the outer end of the gas inlet passage can be connected to the gas source. In this case, the lower end of the second casing is water-sealed by the pump body, so when gas is input into the second casing by the gas source, a gas blockage can be formed in the second casing, so that when the shielded motor is connected to the pump body, it is possible to prevent water in the pump body from entering the motor via the shaft entry and exit hole, which can ensure that the magnetic fluid sealing device does not come into contact with the water, thus achieving waterproof protection for the magnetic fluid sealing device.

Further, the magnetic fluid sealed shaft assembly of the present application is used for a motor/shielded motor, and the motor/shielded motor is a hermetically sealed motor with a separate fan, and the interior of the hermetically sealed motor is capable of forming a gas blockage shield. That is, the interior of the motor can be inflated with natural air or an external gas source (nitrogen, air, etc.). If the magnetic fluid sealing device fails, the liquid level rises and the gas in the outer and inner gas blockage cavities passes through the failed magnetic fluid sealing device and into the upper motor cavity, and at the same time, the medium also rises and flows through the magnetic fluid sealing device and first into the gas cavity around the magnetic fluid. As the liquid level of the medium rises, the gas in the motor cavity is continuously compressed until the gas pressure in the motor cavity is equal to the medium pressure, thus forming an equilibrium and then a gas blockage, so that the liquid level will not rise again. In this case, the interior of the hermetically sealed motor brings together the gas in the gas blockage cavity and some or all of the gas in the cavity around the magnetic fluid sealing, so that the gas pressure in the motor cavity is considerably increased, while the design and arrangement of the space allows the liquid level to be equalized in the lower part of the motor coil, so that even if the magnetic fluid sealing fails, the medium does not rise to the position of the motor coil, thus ensuring that the motor is not damaged.

It should be understood that what is described in the Summary of the Invention part is not intended to limit the key or important features of embodiments of the present invention, nor is it intended to limit the scope of the present invention. Other features of the present invention will become readily understood by the following description.

Figure 1:
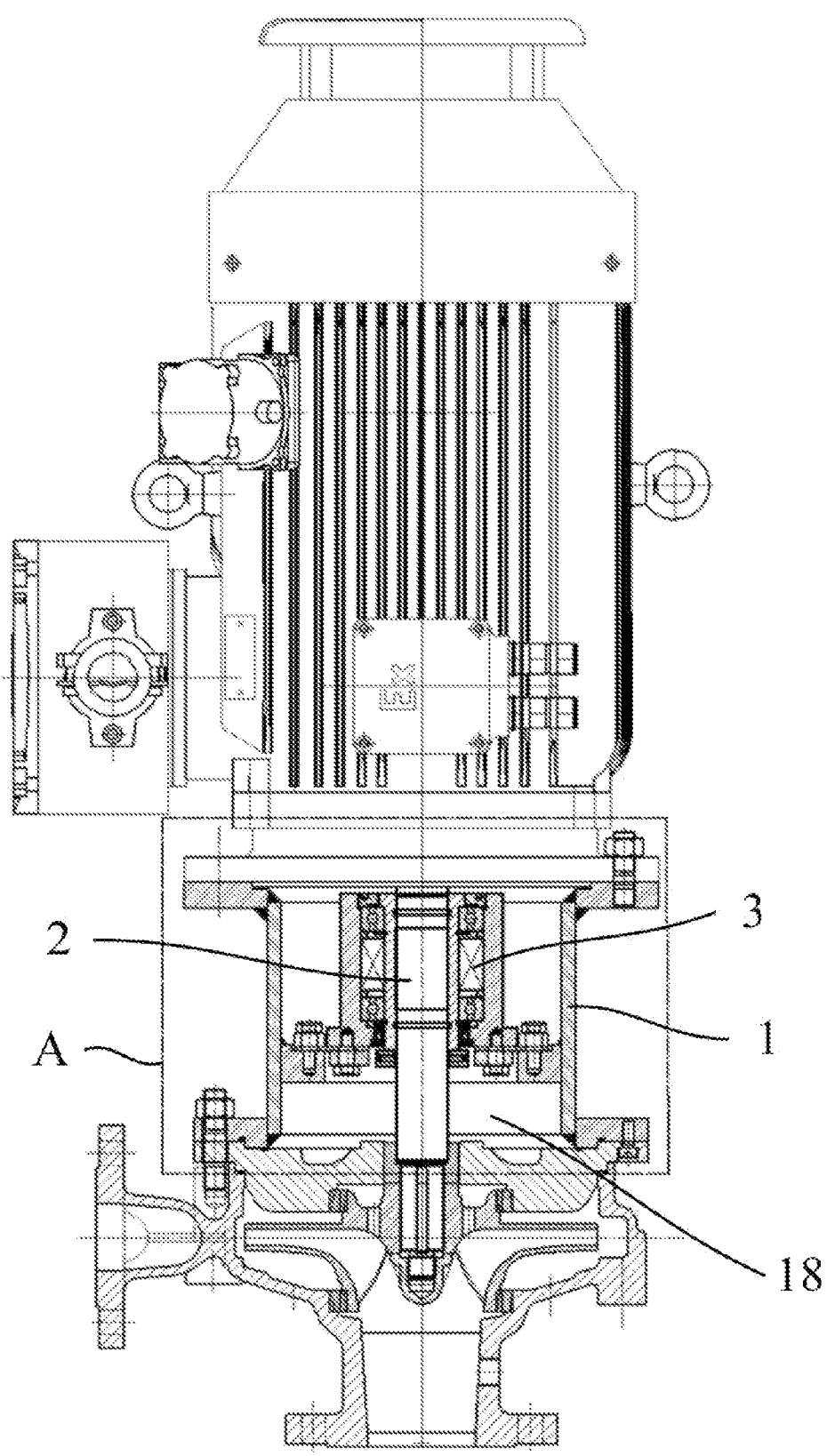
FIG. 1 is a structural schematic diagram of a shielded pump provided by an embodiment of the present invention.

In the drawings, the correspondence between the reference numerals and the component names in FIGS. 1 through 15 is as follows:

1 Housing, 12 Accommodating cavity, 14 Fixed structure, 16 Positioning structure, 18 Outer gas blockage cavity, 2 Rotating shaft, 3 Magnetic fluid sealing device, 30 Mating structure, 32 Fixed sleeve, 322 Limit structure, 34 Magnetic fluid sealing member, 36 Second cooling cavity, 38 Second cooling medium channel, 39 Blocking member, 4 Resilient connecting barrel, 42 Sleeve part. 44 Mounting part, 46 Underpinning mounting part, 5 Inner gas blockage hood 6 Resilient connecting ring, 72 First resilient ring, 74 Second resilient ring, 8 Gas inlet passage, 90 Cushion pad, 92 First cooling cavity, 94 First cooling medium channel, 96 Water pressing sleeve, 98 Water retaining device.

DETAILED DESCRIPTION OF THE EMBODIMENTS

The technical solutions in the embodiments of the present invention will be clearly and completely described below in conjunction with the accompanying drawings in the embodiments of the present invention, and it is clear that the described embodiments are only a part of the embodiments of the present invention, and not all of them. Based on the embodiments in the present invention, all other embodiments obtained by a person of ordinary skill in the art without making creative labor fall within the scope of protection of the present invention.

The magnetic fluid sealed shaft assembly provided by embodiments of the present invention is described below with reference to FIGS. 1 to 15. In particular, the magnetic fluid sealed shaft assembly provided by the present application can be applied to non-precision products such as pumps that require sealing, such as shielded motors, shielded pumps, fans, valves, turbines, and nuclear submarines, as needed. The present application introduces the magnetic fluid sealed shaft assembly mainly by taking the case where the magnetic fluid sealed shaft assembly is used for a shielded motor and a shielded pump as an example.

Figure 14:
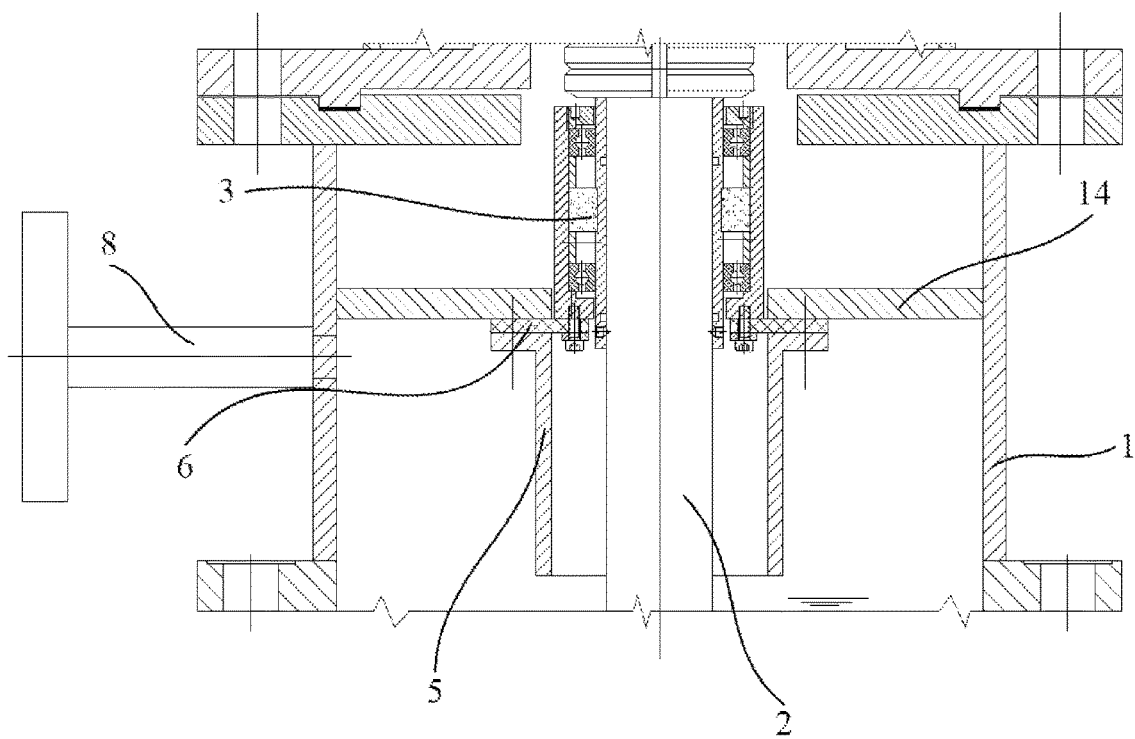
FIG. 14 is a partial structural schematic diagram of a shielded pump provided by an eleventh embodiment of the present invention.
Figure 15:
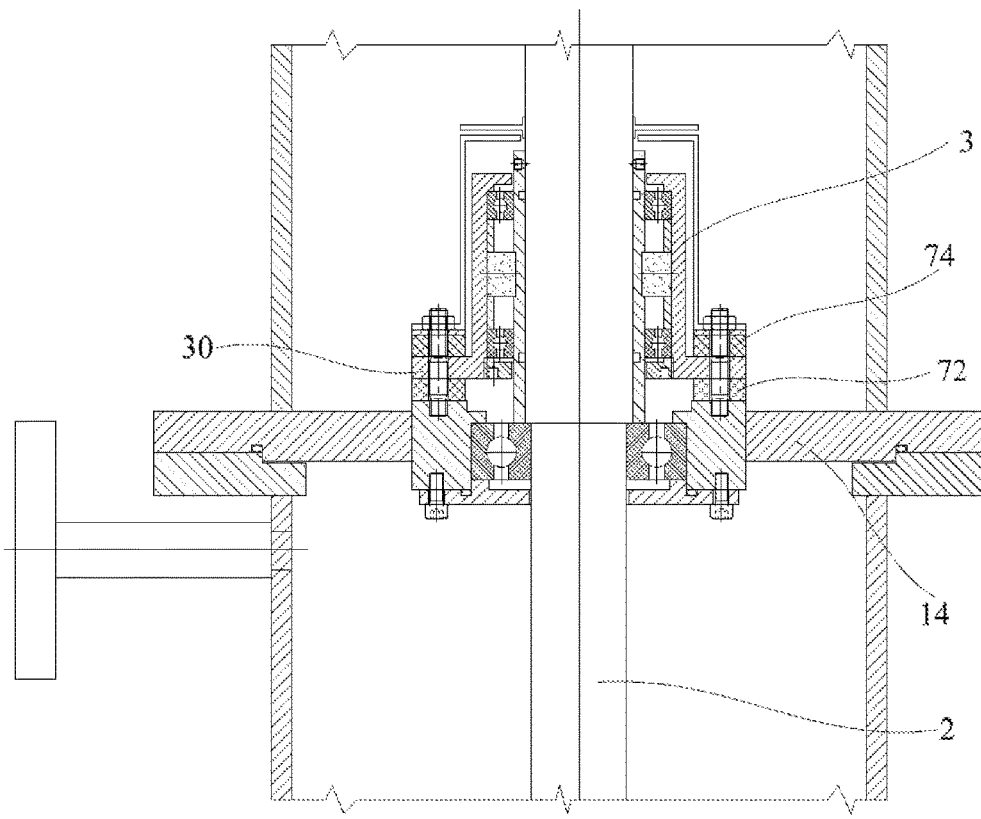
FIG. 15 is a partial structural schematic diagram of a shielded pump provided by a twelfth embodiment of the present invention.

As shown in FIGS. 1 to 15, the embodiments of the first aspect of the present invention provides a magnetic fluid sealed shaft assembly, comprising a housing 1, a rotating shaft 2, a magnetic fluid sealing device 3, and a resilient member, wherein the resilient member may be specifically a resilient connecting barrel 4 in FIGS. 5, 6, 10, and 12 or a resilient connecting ring 6 in FIGS. 1 to 4 and FIGS. 7 to 9, FIG. 11, FIG. 13, and FIG. 14 or a first resilient ring 72 and second resilient ring 74 in FIG. 15. Specifically:

the housing 1 is provided with an accommodating cavity 12, the accommodating cavity 12 being provided with a fixed structure 14 on the inner wall, and the housing 1 may be specifically formed by the connection of a first casing and a second casing, or may be of an integral structure, wherein the first casing and the second casing are preferably arranged up and down, or, of course, may be arranged front to back or left to right;

the rotating shaft 2 is supported and mounted in the accommodating cavity 12; the magnetic fluid sealing device 3 is located in the accommodating cavity 12 and is sleeve mounted on the rotating shaft 2, wherein the housing 1 is provided with space for runout of the magnetic fluid sealing device 3 following the rotating shaft 2 and/or adjustment of a mounting angle and position according to a mounting state of the rotating shaft 2; and the resilient member is hermetically mounted on the magnetic fluid sealing device 3 and is hermetically connected to the fixed structure 14, wherein the magnetic fluid sealing device 3 can be resiliently and hermetically connected to the fixed structure 14 by the resilient member, so that the magnetic fluid sealing device 3 is capable of runout following the rotating shaft 2 and/or adjustment of the mounting angle and position according to the mounting state of the rotating shaft 2. The resilient member may preferably be made of a material with fabric or ribbed fabric that can meet the preset strength requirement and preset resilience requirement. Of course, the resilient member may also be made of a material without fabric or ribbed fabric.

The magnetic fluid sealed shaft assembly according to the present invention comprises the housing 1, the rotating shaft 2, the magnetic fluid sealing device 3 and the resilient member. During mounting, space is reserved in the housing 1 that is required for runout of the magnetic fluid sealing device 3 together with the rotating shaft 2 and/or for self-adjustment of the mounting angle and position by the magnetic fluid sealing device 3, for example, reserving the space required for the runout of the magnetic fluid sealing device 3 along the radial direction or for the runout along the axial direction, or the space required for adjustment of the magnetic fluid sealing device 3 from an inclined mounting state to a vertical mounting state. At the same time, the magnetic fluid sealing device 3 and the fixed structure 14 of the housing 1 are connected by means of a resilient member, so that a resilient connection between the magnetic fluid sealing device 3 and the housing 1 is achieved. In this way, on the one hand, in the case of radial or axial runout of the rotating shaft 2, the magnetic fluid sealing device 3 is capable of runout together with the rotating shaft 2, rather than being restricted by the housing 1 and being incapable of runout together with the rotating shaft 2. On the other hand, the resilient connection between the magnetic fluid sealing device 3 and the housing 1 enables the magnetic fluid sealing device 3 to automatically correct its own mounting angle based on the resilient deformation of the resilient member in the event of a large difference in the perpendicularity and coaxiality of the rotating shaft 2 and the fixed structure 14, thus avoiding the phenomenon of inclined mounting of the magnetic fluid sealing device 3 in the event of a large difference in the perpendicularity and coaxiality of the rotating shaft 2 and the fixed structure 14, thereby enabling the magnetic fluid sealing device 3 to self-correct its angle after inclined mounting. In summary, by reserving movement space for the magnetic fluid sealing device 3 and by making the magnetic fluid sealing device 3 and the housing 1 to be resiliently connected so that the magnetic fluid sealing device 3 can dynamically adjust its own mounting angle and/or mounting position according to the actual situation, the present application mitigates the influence of insufficient precision of the perpendicularity and coaxiality of the rotating shaft 2 and the fixed structure 14 as well as the radial runout of the rotating shaft 2. This avoids the interference and influence of the fixed structure 14 on the housing 1 on the magnetic fluid sealing device 3 during the mounting and operating of the magnetic fluid sealed shaft assembly, reduces the fatigue damage of the magnetic fluid sealing device 3 during the operation process, and eliminates the additional radial force, external torsion, statically indeterminate force, etc., on the bearings inside the magnetic fluid sealing device 3 during the operation process, which allows the magnetic fluid sealing device 3 to be applied in products with low precision such as fans, valves, turbines and pumps, and ensures the service life of the magnetic fluid sealing device 3 when it is applied to products such as fans, valves, turbines and pumps, and reduces the failure rate of the magnetic fluid sealing device 3 after it is applied to products such as fans, valves, turbines and pumps Further, as shown in FIGS. 1 to 14, an outer gas blockage cavity 18 is provided inside the housing 1 and below the magnetic fluid sealing device 3, and the outer gas blockage cavity 18 is capable of forming a gas blockage when the magnetic fluid sealed shaft assembly is in operation.

In this embodiment, the magnetic fluid sealing device 3 is a kind of zero-leakage dynamic sealing, and on the one hand it can make dynamic sealing on the rotating shaft 2, and on the other hand the magnetic fluid sealing device 3 can also make tight sealing on the upper end of the outer gas blockage cavity 18, so as to form hermeticity, and thus enable the upper end of the outer gas blockage cavity 18 to seal the gas. The lower end of the outer gas blockage cavity 18 can be hermetically connected to all rotating equipment such as water pumps that need to seal the pressure, and the interior cavity of the outer gas blockage cavity 18 is completely sealed except for the shaft inlet and outlet, and is not communicated with the interior of the housing 1, so that a separate gas blockage cavity can be formed around the output end of the shaft. For this structure, during operation, the upper part of the outer gas blockage cavity 18 is sealed by the magnetic fluid sealing device 3, thus creating hermeticity, and the lower end of the outer gas blockage cavity 18 is sealed by the liquid, so that the outer gas blockage cavity 18 is sealed and a very hermetic structure is formed. Thus, after the liquid outside the outer gas blockage cavity 18 has passed into the outer gas blockage cavity 18, the gas inside the outer gas blockage cavity 18 cannot be leaked, so that the liquid entering from the outside can only gradually compress the gas inside the outer gas blockage cavity 18 until the pressure of the gas is equal to the pressure of the liquid. Once the pressure of the gas is equal to that of the liquid, the liquid level in the outer gas blockage cavity 18 will no longer rise, and the magnetic fluid sealing device 3 will always be able to be separated from the liquid by the compressed gas after the liquid level has stopped. In this way, blockage of the liquid is formed by the compressed gas in the outer gas blockage cavity 18, and this blocking effect on the liquid by the gas is what is known as the gas blockage in the present application. In this way, using the gas blockage of the outer gas blockage cavity 18, the magnetic fluid sealing device 3 is prevented from coming into contact with the liquid, thus ensuring the operation performance of the magnetic fluid sealing device 3 and thereby enabling the magnetic fluid sealed shaft assembly to be used for sealing and shielding of driving shafts in water pumps, and the like. At the same time, this vertical shielding device also achieves efficient non-leakage sealing and shielding performance through the magnetic fluid sealing device 3 and the outer gas blockage cavity 18, thereby realizing a true 0-leakage.

Figure 2:
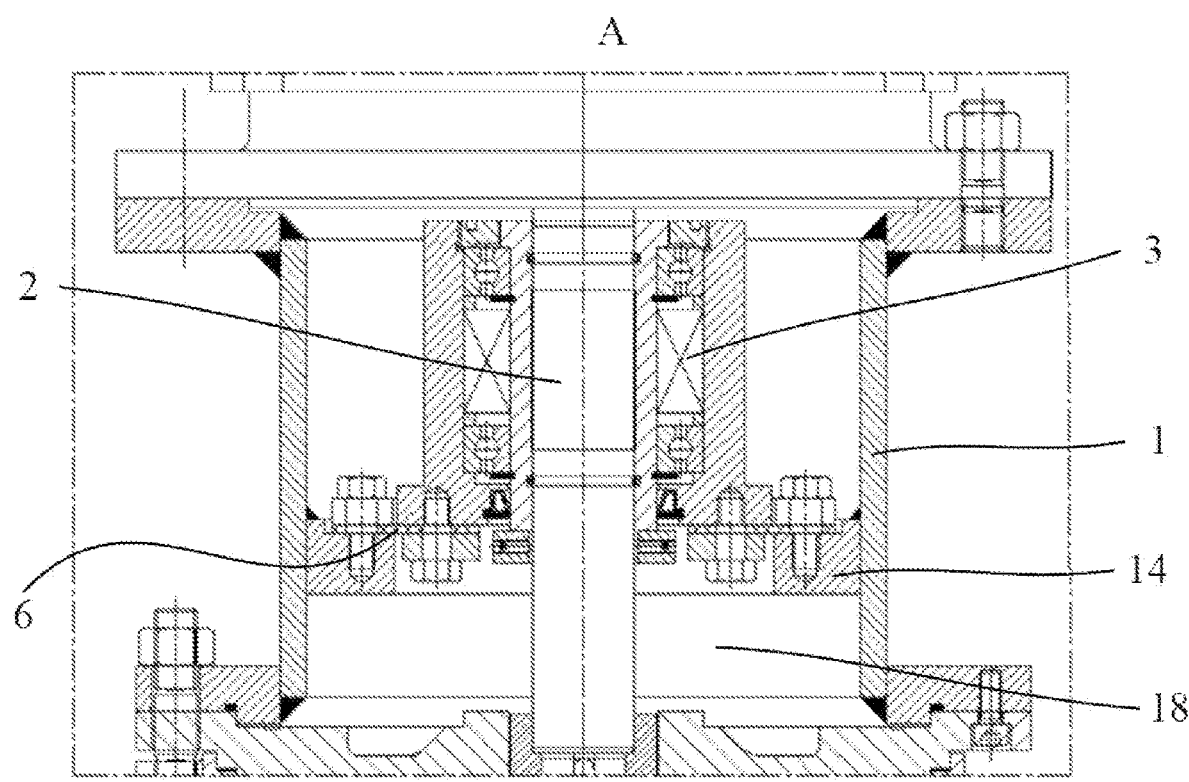
FIG. 2 is a partially enlarged structural schematic diagram of A in FIG. 1.
Figure 3:
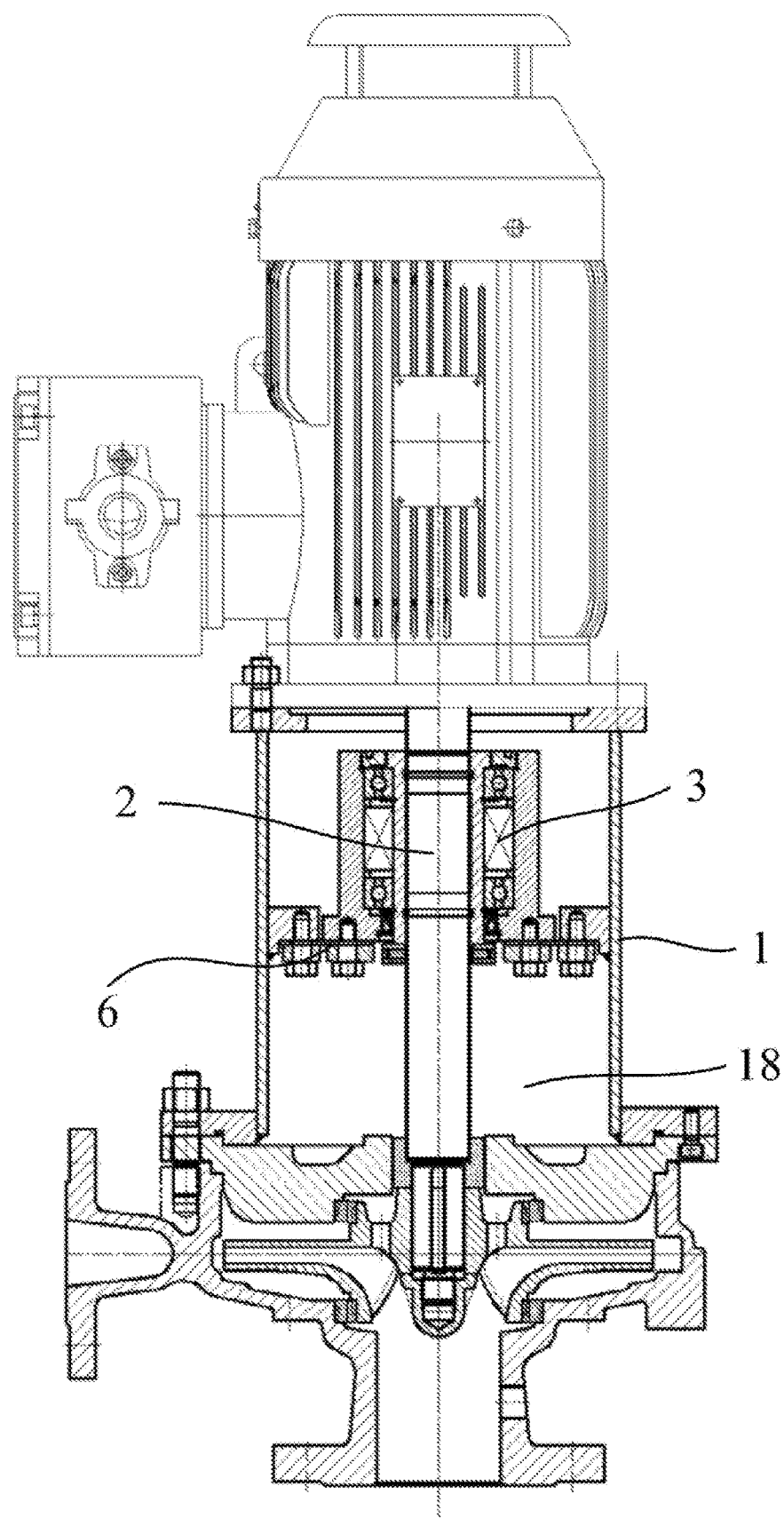
FIG. 3 is a structural schematic diagram of a shielded pump provided by another embodiment of the present invention.

Further, as shown in FIGS. 1 to 6, the shielded pump comprises a motor, a pump, and the housing 1 mounted between the motor and the pump, and the housing 1 is hermetically mounted between the motor casing and the pump casing. The motor shaft protrudes from the motor casing and passes through the housing 1 after which it is in driving connection with the rotating parts of the pump. The lower end of the magnetic fluid sealing device 1 is connected resiliently and hermetically to the fixed structure 14 in the housing 1 by means of a resilient member. The resilient member is a resilient connecting ring 6, and the inner end edge of the resilient connecting ring 6 is fixed to the lower end portion of the magnetic fluid sealing device 1 by screws. The outer end edge of the resilient connecting ring 6 is fixed to the fixed structure 14 by screws. The housing 1, the fixed structure 14, the resilient member, and the lower end portion of the magnetic fluid sealing device form a preset space which is an outer gas blockage cavity 18 capable of forming a gas blockage. In this case, the resilient connecting ring 6 can be fixed to the upper surface of the fixed structure 14, and at this time, the screws or bolts, from above, allow the fixed structure 14 to be connected to the resilient connecting ring 6 (as shown in FIG. 2). Of course, the resilient connecting ring 6 can also be fixed to the lower surface of the fixed structure 14, and at this time, the screws or bolts, from below, allow the fixed structure 14 to be connected to the resilient connecting ring 6 (as shown in FIG. 3).

Figure 4:
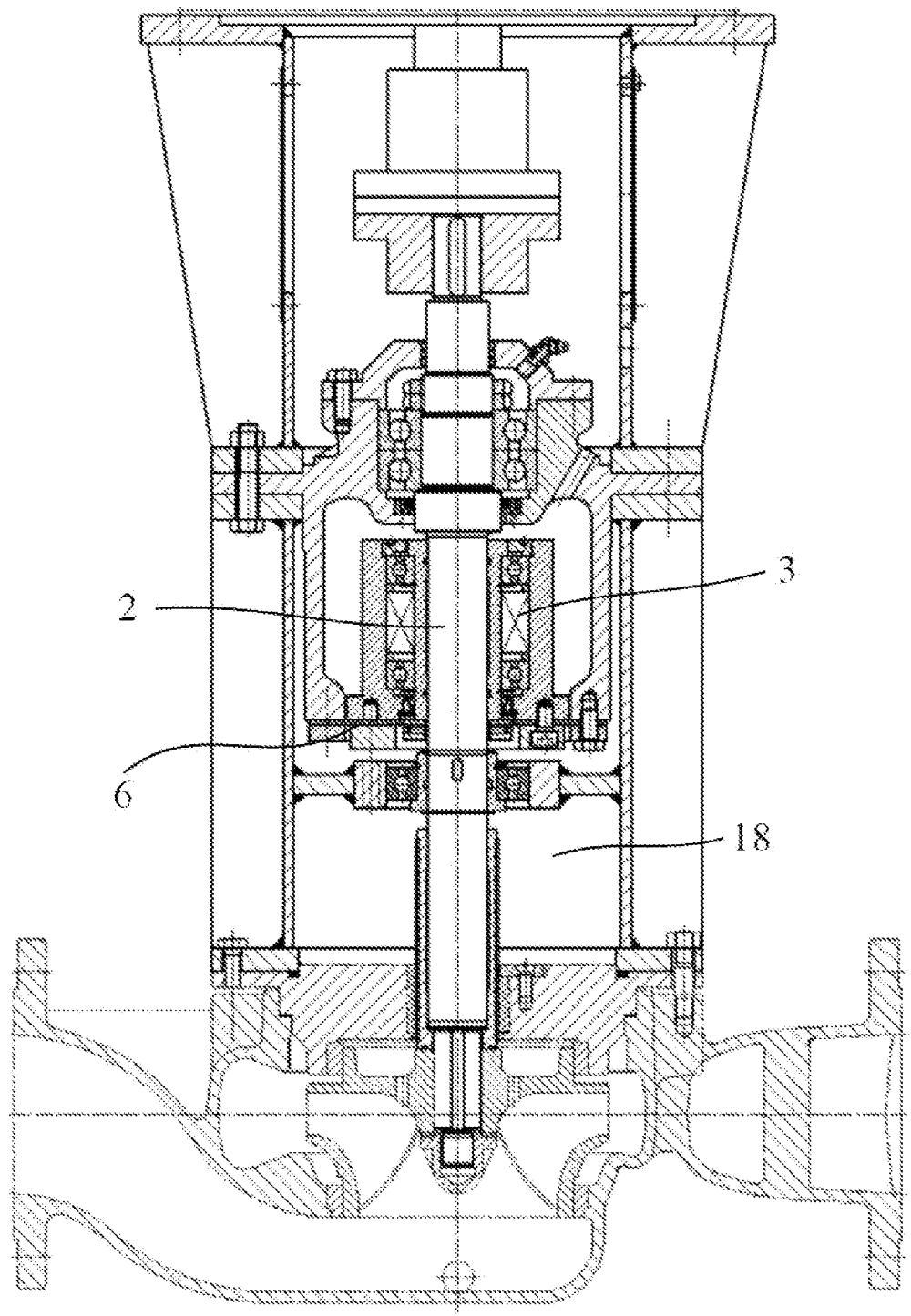
FIG. 4 is a structural schematic diagram of a shielded pump provided by a third embodiment of the present invention.

Further, as shown in FIG. 4, inside the housing 1, there is also a barrier structure mounted below the magnetic fluid sealing device 3, and the outer gas blockage cavity 18 is formed by enclosure by the barrier structure and the lower end of the casing.

Even further, as shown in FIGS. 7, 10, 11, and 14, the magnetic fluid sealed shaft assembly further comprises: an inner gas blockage hood 5, wherein the inner gas blockage hood is mounted in the outer gas blockage cavity 18 and hermetically connected to a lower end of the magnetic fluid sealing device 3 along the axial direction, and the inner gas blockage hood 5 is provided around the outer side of a part of the rotating shaft 2 that extends into the outer gas blockage cavity 18, and an inner gas blockage cavity is formed between the inner gas blockage hood 5 and the rotating shaft 2, and the inner gas blockage cavity is capable of forming a gas blockage when the magnetic fluid sealing device is in operation.

In this embodiment, the inner gas blockage hood 5 is hermetically connected to the lower end of the magnetic fluid sealing device 3 in the axial direction, so that the upper end of the inner gas blockage hood 5 can be sealed by the magnetic fluid sealing device 3 and thus form hermeticity, thereby enabling the inner gas blockage hood 5 to lock in the gas once its lower end is sealed by the liquid. In this way, after the liquid outside the inner gas blockage hood 5 has entered the inner gas blockage hood 5, the gas inside the inner gas blockage hood 5 cannot be leaked, so that the liquid entering from the outside can only gradually compress the gas inside the inner gas blockage hood 5 to form a gas blockage inside the inner gas blockage hood 5. In this way, a further axial sealing of the magnetic fluid sealing device 3 can be carried out in the outer gas blockage cavity 18 by means of the gas blockage formed in the inner gas blockage hood 5, and this can prevent liquids or evaporated gases etc., in the fluid pumping device etc., from coming into contact with the magnetic fluid sealing device 3 after the rotating shaft has been connected to the fluid pumping device, etc. In this way, the magnetic fluid sealing device 3 can be protected by the gas blockage formed inside the inner gas blockage hood 5, thereby enabling the isolation of the magnetic fluid sealing device 3 from the liquid on the outer side of the inner gas blockage hood 5. This structure combines the use of the magnetic fluid sealing device 3, the outer gas blockage cavity 18, and the inner gas blockage hood 5. The combined structure not only provides a completely non-leakage sealing effect for the magnetic fluid sealing device 3, but also enables the outer gas blockage cavity 18 to form a large gas blockage cavity by sealing the outer gas blockage cavity 18 with an external liquid during the sealing and shielding. At the same time, by sealing the lower end of the inner gas blockage hood 5 with the external liquid, it is possible to seal the sealed cavity formed by communicating the internal space of the magnetic fluid sealing device 3 with the internal space of the inner gas blockage hood 5. In this way, by compressing the gas inside the sealed cavity with the external liquid, the sealed cavity can be made to form a small gas blockage cavity, thus ensuring by the gas blockage of two layers of gas blockage cavities, i.e., the inner and outer gas blockage cavities, that the magnetic fluid sealing device 3 does not come into contact with the liquid during use.

Further, the inner gas blockage hood 5 is of a flared or straight barrel shape.

Figure 10:
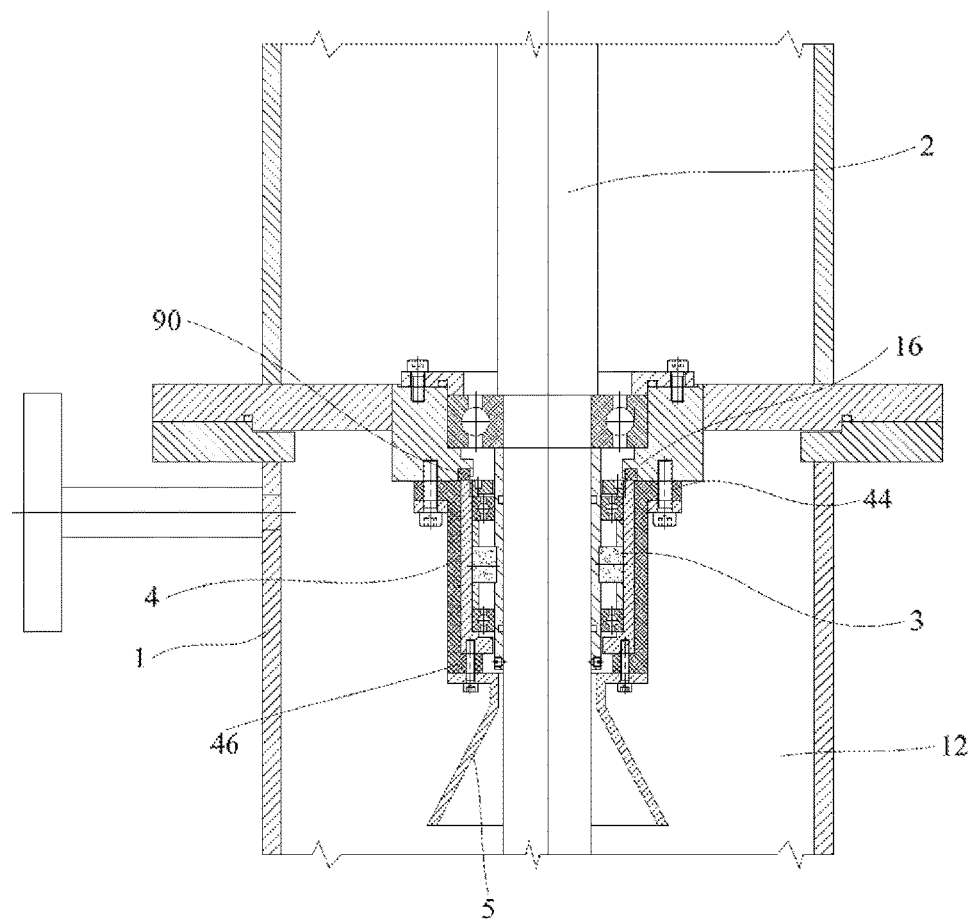
FIG. 10 is a partial structural schematic diagram of a shielded pump provided by a seventh embodiment of the present invention.
Figure 11:
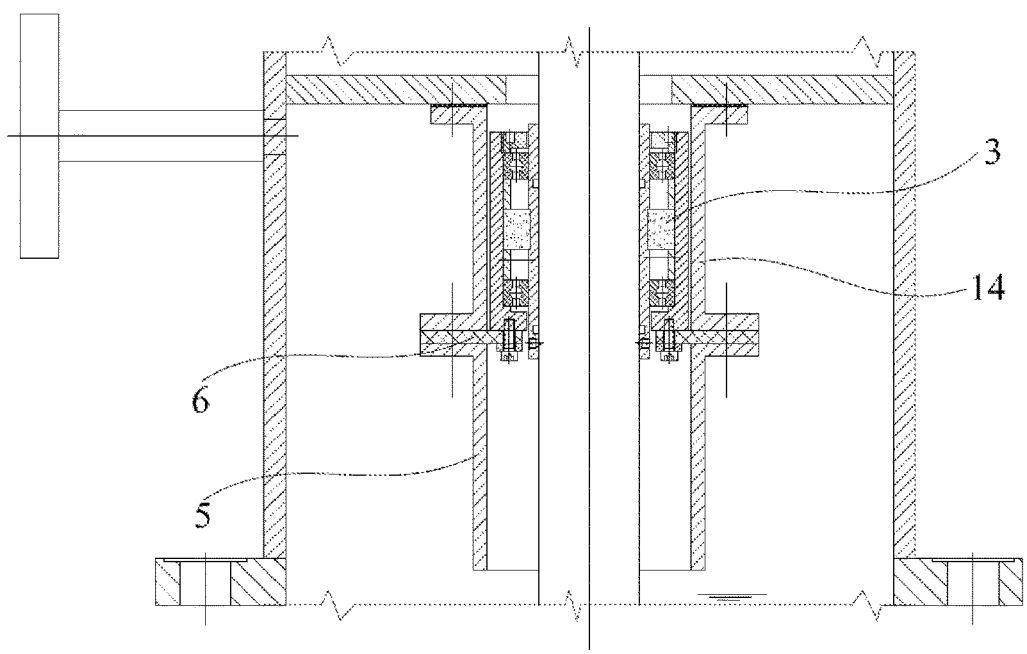
FIG. 11 is a partial structural schematic diagram of a shielded pump provided by an eighth embodiment of the present invention.

Even further, as shown in FIGS. 11 and 14, an upper end of the inner gas blockage hood 5 is provided with a mounting plate, and the resilient member is partially clamped and mounted between the mounting plate and a lower end portion of the magnetic fluid sealing device 3, or the resilient member is partially clamped and mounted between the mounting plate and the fixed structure. That is, the inner gas blockage hood 5 can be mounted directly to the fixed structure mounting the mounting plate, at which time the resilient member can be clamped and mounted through the mounting plate and the fixed structure. Of course, as shown in FIG. 10, the mounting plate can also be mounted directly to the lower end portion of the magnetic fluid sealing device 3 or be fixedly mounted to the lower end portion of the magnetic fluid sealing device 3 together with the resilient member.

In the above embodiment, preferably, as shown in FIGS. 5, 7, 9, and 11, the magnetic fluid sealed shaft assembly is of a vertical structure, and the housing comprises a first casing and a second casing that are sealedly connected to each other, wherein a shaft via hole is provided at the joint of the first casing and the second casing, and the bottom of the second casing is provided with a shaft entry and exit hole, and the rotating shaft extends from the inside of the first casing into the second casing through the shaft via hole and extends out from the shaft entry and exit hole, and the magnetic fluid sealing device 3 is mounted at the shaft via hole by the resilient member for use in sealing the shaft via hole; After the shaft entry and exit hole of the second casing has been sealed, a gas blockage can be formed in the lower end of the second casing and the lower boundary of the gas blockage is located on the lower side of the magnetic fluid sealing device, and the gas required to form the gas blockage is natural air in the second casing, or the magnetic fluid sealed shaft assembly further comprises a gas inlet passage 8, where one end of the gas inlet passage 8 is communicated with the lower end of the second casing and the other end of the gas inlet passage 8 is communicated with a gas source, and the gas required to form the gas blockage comprises natural air in the second casing and gas input from the gas inlet passage 8.

In this embodiment, when the magnetic fluid sealed shaft assembly is used in a structure such as a pump, each part of the second casing can be tightly sealed so that a gas blockage can be formed at the lower end of the second casing. In this way, during operation, the gas blockage formed can be used to form sealing and shielding against liquids, etc., and prevent external liquids, etc., from entering the second casing, thereby forming a waterproof protection for the magnetic fluid sealing device 3. For example, when the magnetic fluid sealed shaft assembly is used in a vertical shielded pump, the first casing is used as the motor casing of the motor, and the second casing is used to sealedly connect the motor casing and the pump, and the rotating shaft 2 is used as the motor shaft and is connected to the rotating part of the pump body after extending out of the shaft entry and exit hole. In this structure, after the vertical shield pump is mounted, the lower end of the second casing is water sealed by the pump body, so that the natural air inside the second casing and the air coming from the outside can form a gas blockage under the magnetic fluid sealing device 3 to prevent water in the pump body from entering the motor through the shaft entry and exit hole, which can ensure that the magnetic fluid sealing device 3 does not come into contact with water, thus achieving the waterproof protection for the magnetic fluid sealing device 3. By setting the gas inlet passage on the second casing, it is convenient to input the external gas into the second casing through the gas inlet passage, so that the pressure of the formed gas blockage can be increased. Of course, when the pressure of the gas blockage formed by natural air meets the required working condition, it is also possible not to arrange the gas inlet passage 8.

Figure 5:
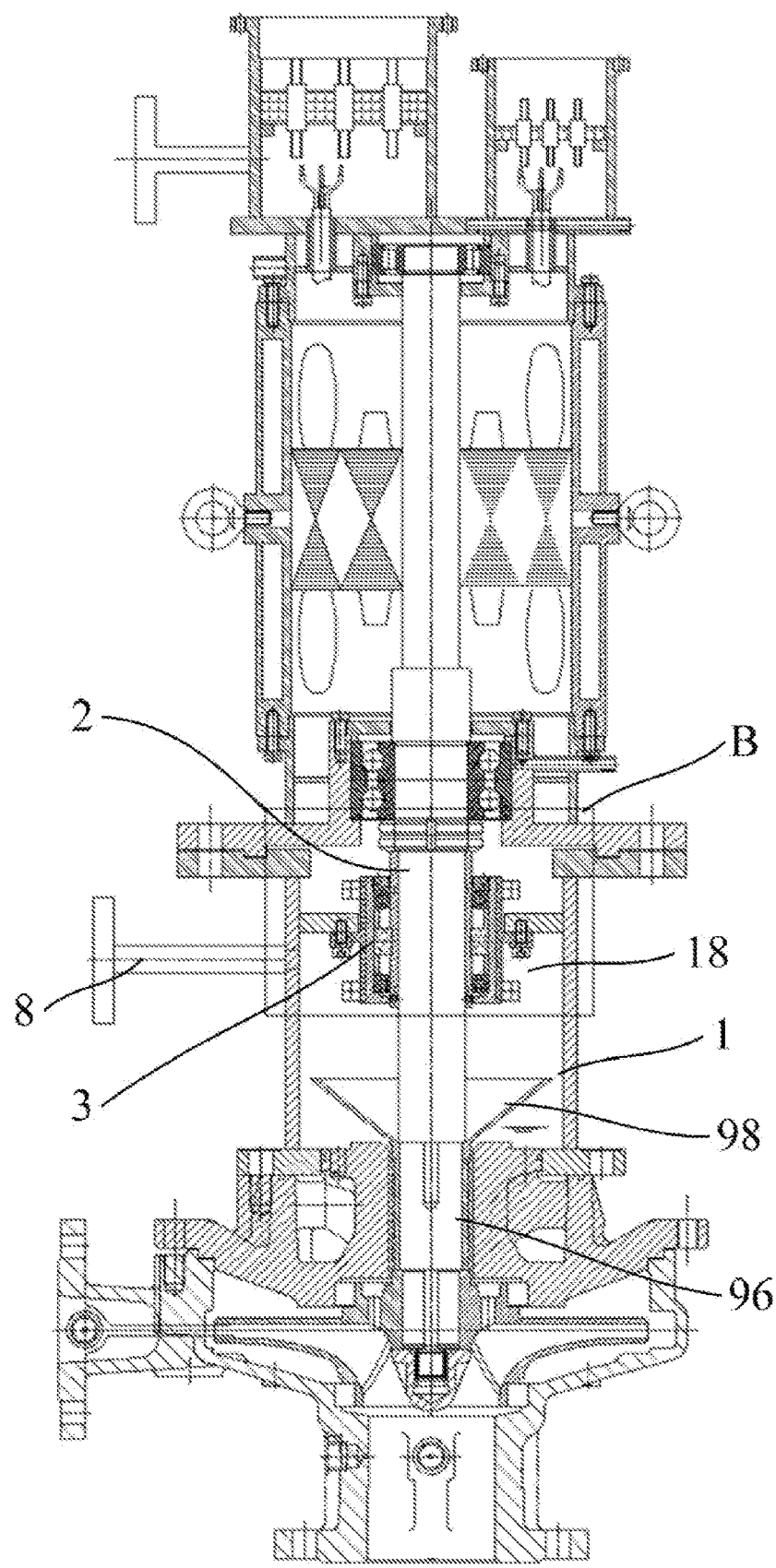
FIG. 5 is a structural schematic diagram of a shielded pump provided by a fourth embodiment of the present invention.

Further preferably, the magnetic fluid sealed shaft assembly also comprises a bearing body assembly for supporting and mounting the rotating shaft 2, and the magnetic fluid sealing device 3 can be mounted on either axially arranged side of the bearing body assembly by means of a resilient member, and in the shielded pump provided in FIGS. 1, 4 and 5, the magnetic fluid sealing device 3 is mounted under the bearing body assembly by means of a resilient member. In FIG. 15, the magnetic fluid sealing device 3 is mounted above the bearing body assembly by means of a resilient member. In short, the specific mounting positions of the magnetic fluid sealing device 3 and the bearing body assembly can be reasonably set according to the structural needs, which is not specifically limited here.

Among them, the first casing and the second casing are preferably of a split structure, but of course, they may also be of a one-piece structure. In a specific embodiment, the magnetic fluid sealed shaft assembly is used for a motor, and at this time, the first casing is the motor casing, and the second casing is sealedly connected between the motor casing and the load (such as the pump body). In addition, the motor is preferably a water-cooled shielded motor. As shown in FIG. 14 and FIG. 15, when the magnetic fluid sealing device 3 is mounted in the motor casing of the motor body, the lower bearing body assembly of the motor can be located either on the upper side of the magnetic fluid sealing device 3 or on the lower side of the lower bearing body assembly, and at the same time, the magnetic fluid sealing device 3 is provided with a magnetic isolation device on the side away from the lower bearing body assembly, and the magnetic isolation device is mounted on the motor shaft, and the magnetic isolation device can be a magnetic isolation hood that can hood the magnetic fluid sealing device 3, or a relatively simple magnetic isolation plate.

Preferably, as shown in FIGS. 1 and 5 and FIGS. 6 and 14, the fixed structure 14 is provided on the inner side wall of the housing 1, for example, the fixed structure 14 may be a boss provided on the inner side wall of the housing 1, and at this time, the magnetic fluid sealing device 3 is resiliently connected to the inner side wall of the housing 1 by a resilient member, and this structure is suitable for mounting the magnetic fluid sealing device 3 to the middle of the housing 1. In another embodiment, as shown in FIG. 4, FIG. 7 to FIG. 10 to FIG. 12, and FIG. 15, the fixed structure 14 is mounted on an end portion structure (e.g., an end cap) located on the housing 1. For example, the fixed structure 14 may be a barrel-shaped structure mounted on the end cap, in which case the magnetic fluid sealing device 3 is resiliently connected directly to the end portion structure, such as the end cap, by a resilient member. This structure is suitable for mounting the magnetic fluid sealing device 3 to the end portion of the housing 1.

In the above embodiment, a radial spacing is provided between the magnetic fluid sealing device 3 and the fixed structure 14, and an axial spacing is provided between the housing 1 and two ends of the magnetic fluid sealing device 3. In this way, during mounting and use, the magnetic fluid sealing device 3 is not only capable of runout in the radial or axial direction together with the rotating shaft 2, but also capable of inclined rotation along the rotating shaft 2 to correct and adjust its own mounting angle and position, thus enabling the magnetic fluid sealing device 3 to avoid damage to the magnetic fluid sealing device 3 due to insufficient precision in the mounting and machining of the housing 1 or the rotating shaft 2.

In the above embodiment, preferably, as shown in FIG. 5, FIG. 6, FIG. 10, and FIG. 12, the resilient member is a resilient connecting barrel 4, and the resilient connecting barrel 4 comprises a sleeve part 42 and a mounting part 44, the sleeve part 42 sleeving and being mounted on the magnetic fluid sealing device 3, and the mounting part 44 being provided on the sleeve part 42 and sealedly and fixedly connected to the fixed structure 14, wherein the sleeve part 42 and the mounting part 44 are of a one-piece structure, and a radial spacing is provided between the sleeve part 42 and the fixed structure 14, and an axial spacing is provided between the housing 1 and two ends of the magnetic fluid sealing device 3.

In this embodiment, the resilient connecting barrel 4 sleeves the magnetic fluid sealing device 3 by the sleeve part 42, and then the resilient connection between it and the fixed structure 14 is realized by the mounting part 44. In this structure, during mounting, the resilient connecting barrel 4 and the magnetic fluid sealing device 3 can be assembled into one assembly first, and then after the entire assembly is mounted to the fixed position of the rotating shaft 2, the mounting part 44 of the resilient connecting barrel 4 is fixedly connected to the fixed structure 14 by means of screws, or the like.

Figure 6:
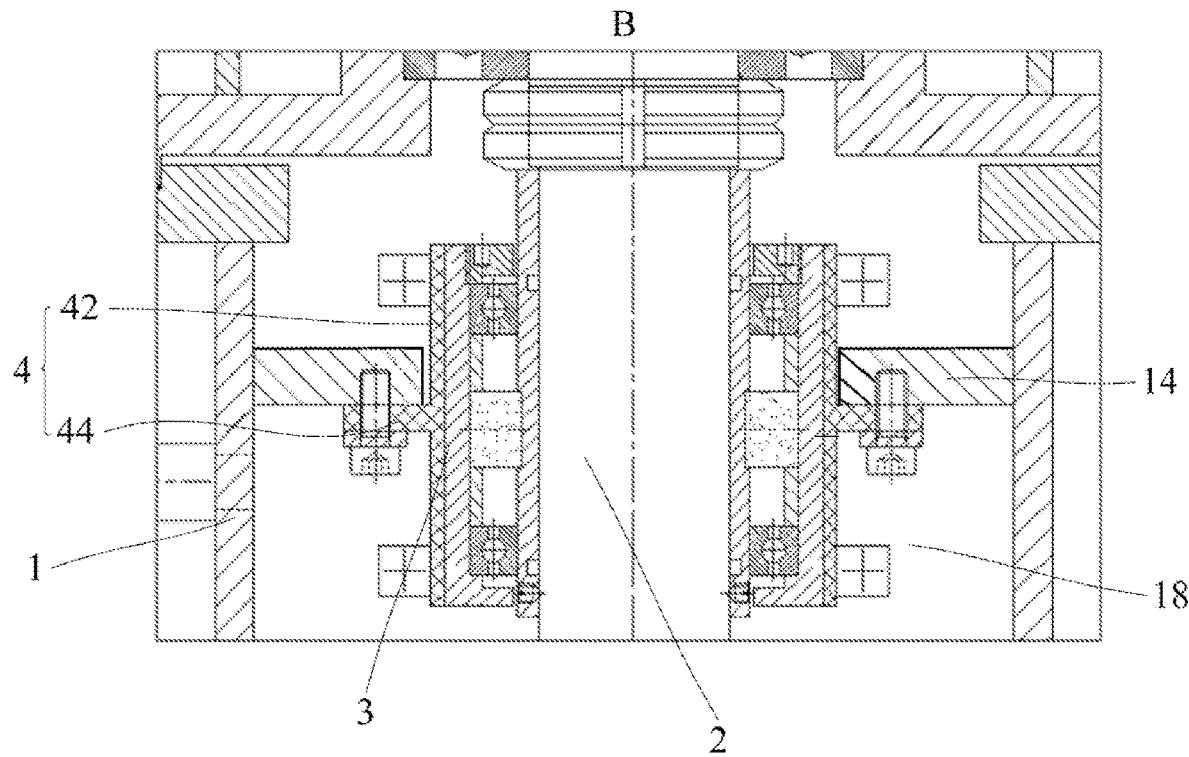
FIG. 6 is a partially enlarged structural schematic diagram of B in FIG. 1.
Figure 12:
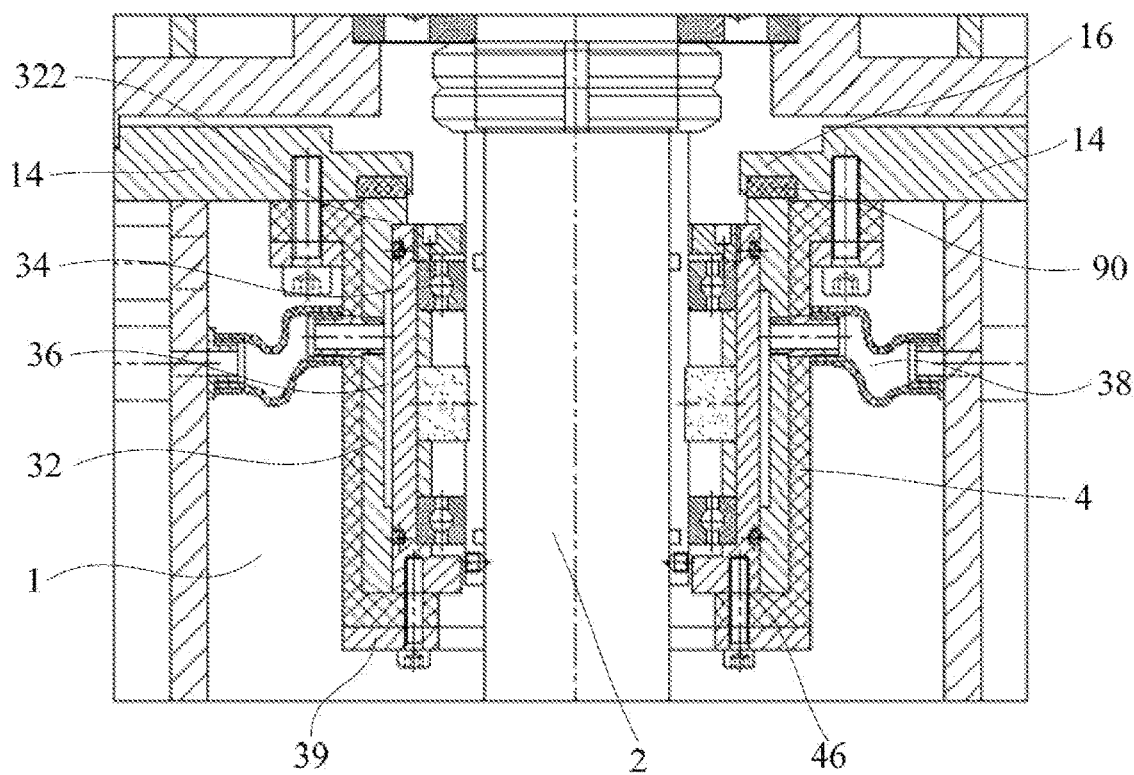
FIG. 12 is a structural schematic diagram of a shielded pump provided by a ninth embodiment of the present invention.
Figure 13:
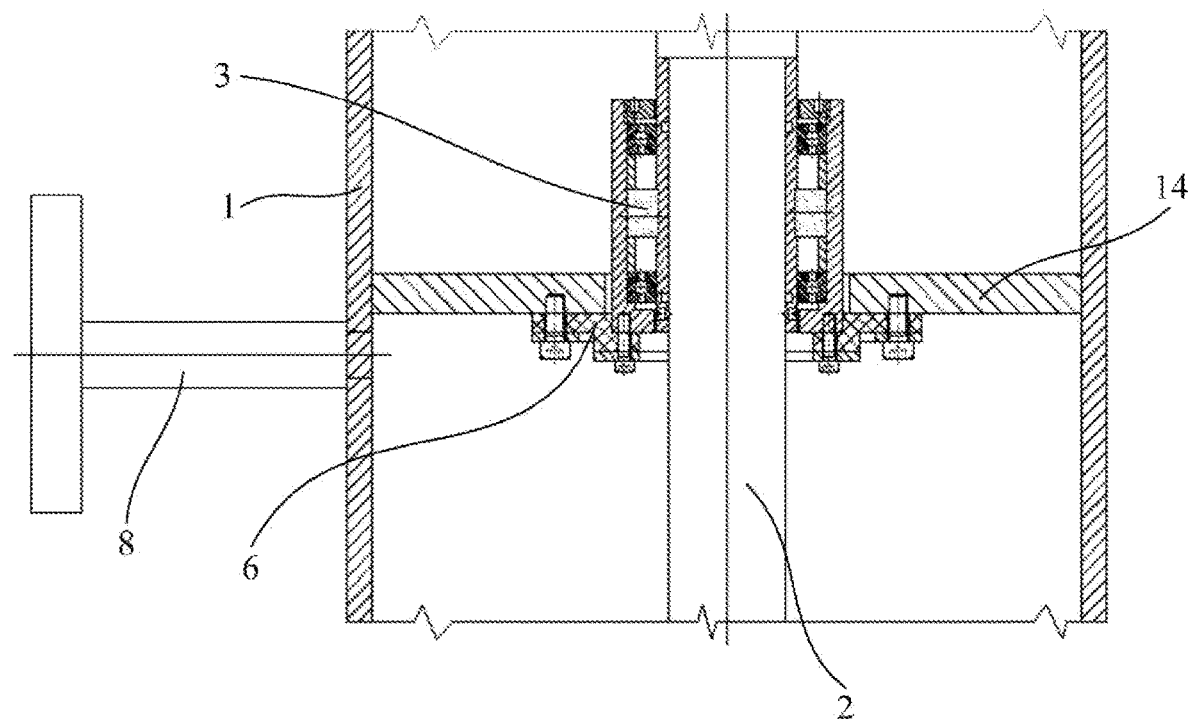
FIG. 13 is a structural schematic diagram of a shielded pump provided by a tenth embodiment of the present invention.

Further, the mounting part 44 is an annular retaining ring provided on an outer side wall of the sleeve part 42 along the circumferential direction of the sleeve part 42. In this case, in one specific embodiment, as shown in FIGS. 5 and 6, the annular retaining ring is located at a middle position of the sleeve part 42 and is connected to the fixed structure 14 by screws, and two ends of the sleeve part 42 fixedly sleeve the magnetic fluid sealing device 3 by at least two fastening members. In another specific embodiment, as shown in FIG. 10 and FIG. 12, the annular retaining ring is provided at an end portion position of the sleeve part 42 and is connected to the fixed structure 14 by screws, and the other end portion position of the sleeve part 42 is provided with an underpinning mounting part 46 that adheres to one end face of the magnetic fluid sealing device 3, the underpinning mounting part 46 being fixedly mounted to the end face of the magnetic fluid sealing device 3 by screws, and the annular retaining ring, the sleeve part 42, and the underpinning mounting part 46 being of a one-piece structure, and the underpinning mounting part 46 being provided with a through hole for the rotating shaft 2 to pass through. Even further, a cushion pad 90 is provided between the end of the magnetic fluid sealing device 3 away from the underpinning mounting part 46 and the housing 1, and with this cushion pad 90, space can be reserved for runout of the magnetic fluid sealing device 3 along the axial direction or for the rotation and inclination relative to the rotating shaft 2.

In yet another embodiment, as shown in FIGS. 1 to 4, 7 to 9, 11 and 14, a radial spacing is provided between the fixed structure 14 and the magnetic fluid sealing device 3, and the resilient member is a resilient connecting ring 6, a part of the resilient connecting ring 6 being fixedly mounted on an end face of a first end portion of the magnetic fluid sealing device 3 and the other part of the resilient connecting ring 6 being fixedly mounted on the fixed structure 14. Preferably, the resilient connecting ring 6 and the end portion of the magnetic fluid sealing device 3 may preferably be fixed to each other by screws, and the resilient connecting ring 6 and the fixed structure 14 may also preferably be fixed to each other by screws. Here, in the case where the magnetic fluid sealing device 3 is a structure including a fixed sleeve 32 and a magnetic fluid sealing member 34, the resilient connecting ring 6 extends to the end face of the magnetic fluid sealing member 34 to seal and mount the magnetic fluid sealing member 34 within the fixed sleeve 32.

Preferably, as shown in FIGS. 7 to 10, a positioning structure 16 is provided inside the housing 1 and corresponding to a second end portion of the magnetic fluid sealing device 3, a cushion pad 90 being provided between the positioning structure 16 and the second end portion of the magnetic fluid sealing device 3. By providing the cushion pad 90, movement space is reserved for the axial runout of the magnetic fluid sealing device 3, while the cushion pad 90 can limit the two end portions of the magnetic fluid sealing device 3 together with the resilient connecting ring 6.

Further, as shown in FIGS. 7 to 9 and 11, the fixed structure 14 is a barrel-shaped structure that is mounted on an inner wall of the housing 1 and is provided in the axial direction, the magnetic fluid sealing device 3 is located inside the barrel-shaped structure and is provided with a radial spacing from the barrel-shaped structure, the end face of the first end of the magnetic fluid sealing device 3 is flush with the corresponding end face of the barrel-shaped structure, an inner side part of the resilient connecting ring 6 is fixedly mounted on an end face of a first end of the magnetic fluid sealing device 3 by screws, and an outer side part of the resilient connecting ring 6 is fixedly mounted on an end face of the barrel-shaped structure that corresponds to the end face of the first end of the magnetic fluid sealing device 3 by screws.

In one embodiment, as shown in FIGS. 1 to 6, the magnetic fluid sealing device 3 is a normal structure without a cooling function, for example, the magnetic fluid sealing device 3 is a structure without the fixed sleeve 32.

Figure 7:
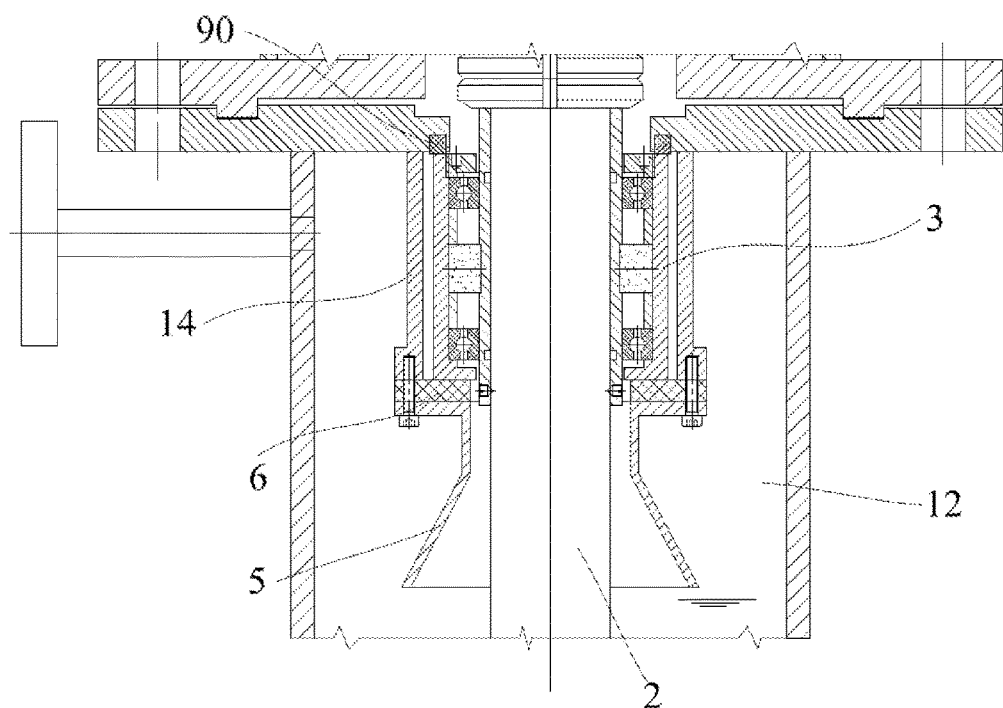
FIG. 7 is a structural schematic diagram of a shielded pump provided by a fifth embodiment of the present invention.
Figure 8:
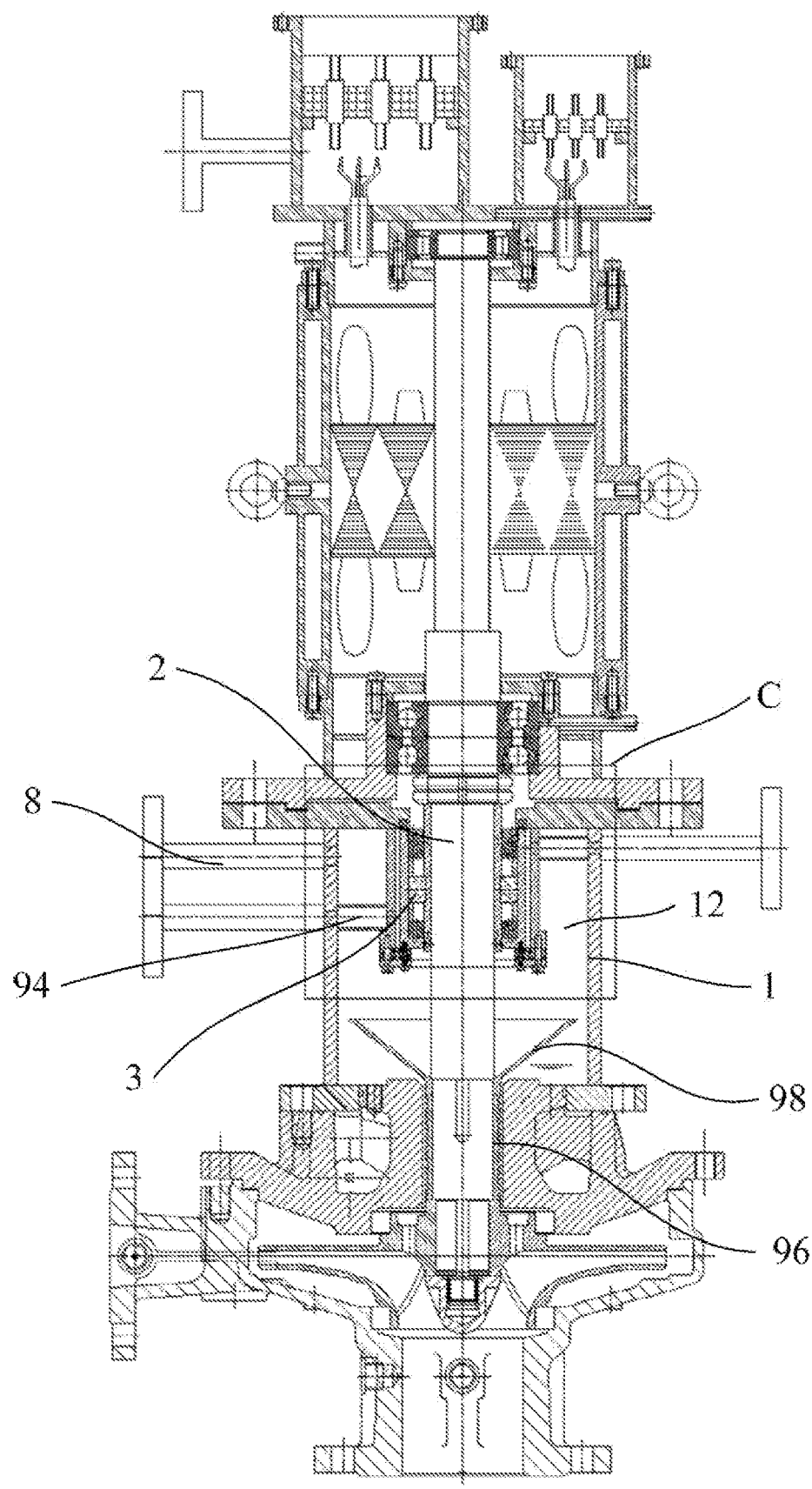
FIG. 8 is a structural schematic diagram of a shielded pump provided by a sixth embodiment of the present invention.
Figure 9:
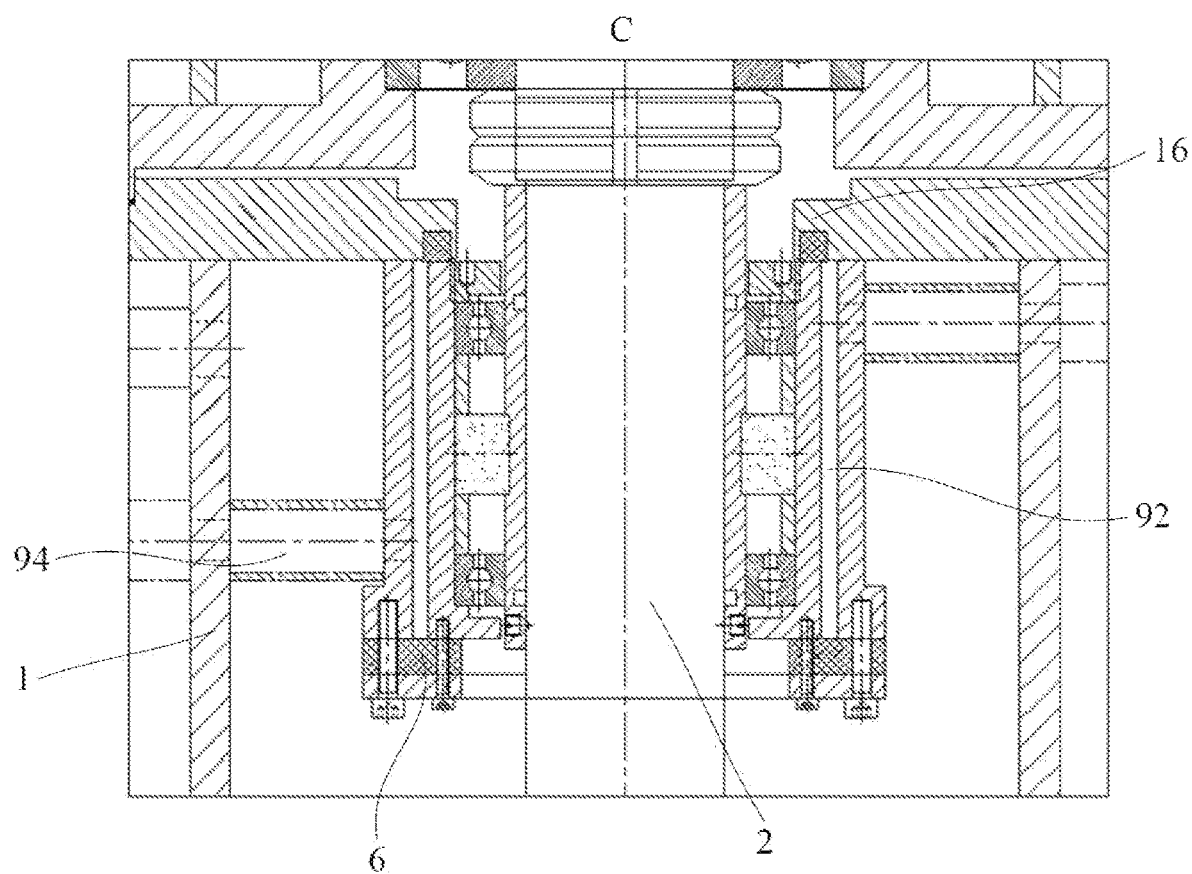
FIG. 9 is a partially enlarged structural schematic diagram of C in FIG. 8.

In another embodiment, preferably, as shown in FIGS. 7 to 9, a sealed first cooling cavity 92 is enclosed among the resilient connecting ring 6, the magnetic fluid sealing device 3, the fixed structure 14, and the cushion pad 90, and the magnetic fluid sealed shaft assembly further comprises a first cooling medium channel 94 of which one end is sealedly communicated with the first cooling cavity 92, the other end of the first cooling medium channel 94 being communicated with the outside of the housing 1.

In this embodiment, the magnetic fluid sealing device 3 can be cooled by supplying the cooling medium to the first cooling cavity 92 through the first cooling medium channel 94, so that the bearings in the magnetic fluid sealing device 3 can be prevented from being overheated during operation.

In a preferred embodiment, as shown in FIG. 15, the magnetic fluid sealing device 3 is provided with at least one mating structure 30 that is mounted in a mating manner to the fixed structure 14, and the resilient member comprises a first resilient ring 72 provided between the at least one mating structure 30 and the fixed structure 14 and/or a second resilient ring 74 located on the side of the mating structure 30 away from the fixed structure 14, wherein the fixed structure 14, the at least one mating structure 30, the first resilient ring 72 and/or the second resilient ring 74 are secured by a fastener, and after the fixed structure 14, the at least one mating structure 30, the first resilient ring 72 and/or the second resilient ring 74 are secured by the fastener, the at least one mating structure 30 is resiliently connected to the fixed structure 14 so that the magnetic fluid sealing device 3 is capable of runout along the axial direction of the rotating shaft relative to the fixed structure 14 and/or correction and adjustment of its mounting angle and position according to the mounting state of the rotating shaft. As a result, the magnetic fluid sealing device 3 can dynamically adjust its own mounting angle and/or mounting position, thereby avoiding mutual interference and conflict between the magnetic fluid sealing device 3 and the fixed structure 14. Among them, the mating structure 30 is preferably of a flange structure and the mating structure 30 may be an annular structure provided along the circumferential direction of the magnetic fluid sealing device 3, the annular structure being provided with a plurality of mounting holes, or the mating structure 30 may be a plurality and provided at intervals along the circumferential direction of the magnetic fluid sealing device 3, wherein the plurality of mating structures 30 may all be shaped as projections or mounting plates with mounting holes. The first resilient ring 72 and/or the second resilient ring 74 may be rubber ring or silicone ring, etc. Of course, the first resilient ring 72 and/or the second resilient ring 74 may also be other structures capable of compression deformation. The fastener is preferably a bolt or screw. During mounting, it is necessary to perform a certain preloaded compression of the first resilient ring 72 and/or the second resilient ring 74 by the fastener, and at the same time it is necessary to ensure that the first resilient ring 72 and/or the second resilient ring 74 still have a sufficient amount of deformation after being well preloaded and compressed by the fastener, so that the fixed structure 14 and the mating structure 30 remain elastically connected, thereby allowing the mating structure 30 to move with the magnetic fluid sealing device 3 as a whole.

Further preferably, the magnetic fluid sealing device 3 comprises a magnetic fluid sealing member 34 as well as a fixed sleeve 32 that is provided outside the magnetic fluid sealing member, wherein a mating structure 30 such as a flange structure is provided around the fixed sleeve 32, and is preferably of a one-piece structure with the fixed sleeve 32.

In a further specific embodiment, as shown in FIG. 12, the structure of the magnetic fluid sealing device 3 comprises a fixed sleeve 32, a magnetic fluid sealing member 34, and a second cooling medium channel 38, wherein the magnetic fluid sealing member 34 is mounted inside the fixed sleeve 32 and a sealed second cooling cavity 36 is provided between the inner side wall of the fixed sleeve 32 and the outer side wall of the magnetic fluid sealing member 34; one end of the second cooling medium channel 38 is communicated with the second cooling cavity 36 and the other end of the second cooling medium channel 38 is communicated with the outside of the housing 1; and a resilient member is connected between the fixed sleeve 32 and the fixed structure 14 so that the fixed sleeve 32 is sealedly and resiliently connected to the fixed structure 14.

In this embodiment, the magnetic fluid sealing device 3 comprises a fixed sleeve 32, a magnetic fluid sealing member 34, and a second cooling medium channel 38 that is used for conveying cooling medium, and a sealed second cooling cavity 36 is enclosed between the fixed sleeve 32 and the magnetic fluid sealing member 34, and the magnetic fluid sealing device 3 can be cooled by supplying the cooling medium to the second cooling cavity 36 through the second cooling medium channel 38, so that the bearings of the magnetic fluid sealing device 3 can be prevented from being overheated during operation. During the specific use, the outer end of the second cooling medium channel 38 can be communicated with a cooling medium source (e.g., water source).

Preferably, the cooling medium is water, so that the cooling of the magnetic fluid sealing device 3 can be achieved by water cooling.

Further preferably, the fixed sleeve 32 is made of a metallic material, which can ensure the strength of the fixed sleeve 32 and enhance the heat dissipation efficiency of the fixed sleeve 32.

Further preferably, as shown in FIG. 12, the inner side wall of one end of the fixed sleeve 32 is provided with a limit structure 322, and the other end of the fixed sleeve 32 is mounted with a removable blocking member 39, where the magnetic fluid sealing member 34 is mounted between the blocking member 39 and the limit structure 322 in a limit manner.

In this embodiment, the limit mounting of the magnetic fluid sealing member 34 in the fixed sleeve 32 is achieved by means of the limit structure 322 and the blocking member 39, and during mounting, the magnetic fluid sealing member 34 can first be inserted into the fixed sleeve 32 from the end where the limit structure 322 is not provided, and the magnetic fluid sealing member 34 can be made to abut against the limit structure 322, and then the blocking member 39 can be mounted by means of screws, etc., so as to block the other end of the magnetic fluid sealing member 34.

Here, when the resilient member is a resilient connecting ring 6, the blocking member 39 is preferably a part of the resilient connecting ring 6.

As shown in FIGS. 1 to 14, a second aspect of the present invention provides a shielded motor comprising a motor configuration assembly for implementing a motor function and the magnetic fluid sealed shaft assembly provided in any one of the embodiments of the first aspect, wherein the rotating shaft of the magnetic fluid sealed shaft assembly is a motor shaft. The housing comprises a first casing and a second casing sealedly connected to each other, wherein a shaft via hole is provided at the joint of the first casing and the second casing, the first casing is a motor casing, the motor shaft extends from the inside of the motor casing into the second casing through the shaft via hole, and a shaft entry and exit hole is provided on the end of the second casing away from the first casing, the magnetic fluid sealing device is mounted at the shaft via hole by means of the resilient member for use in sealing the shaft via hole, and a bearing body assembly for supporting the motor shaft is also mounted at the shaft via hole, on the upper side or lower side of the magnetic fluid sealing device, and after the end of the second casing away from the motor casing is sealedly connected to the load equipment, a gas blockage can be formed therein.

The shielded motor provided according to embodiments of the present invention comprises a motor configuration assembly as well as the magnetic fluid sealed shaft assembly as provided in any one of the embodiments of the first aspect, wherein during the mounting, a new second casing can be extended over the motor casing of the existing motor body and the output end of the motor shaft can be inserted into the second casing via a shaft via hole at the joint of the motor body with the second casing. With this structure, it is possible to use the magnetic fluid sealed shaft assembly provided in any one of the embodiments of the first aspect to perform the shaft face sealing and shielding of the motor shaft, thus providing the beneficial effect of the magnetic fluid sealed shaft assembly provided in any one of the embodiments of the first aspect, which will not be repeated here.

Further, the shielded motor of the present application is a hermetically sealed motor, and the interior of the hermetically sealed motor is capable of forming a gas blockage shield. The shielded motor has a separate fan.

Further, preferably, the magnetic fluid sealed shaft assembly further comprises a gas inlet passage in communication with the second casing and inputting gas into the second casing, wherein a gas blockage can be formed inside the second casing. When the shielded motor is connected to the pump, with the gas blockage, water in the pump can be prevented from entering the motor through the shaft entry and exit hole.

Further, preferably, the shielded motor further comprises a gas source communicated with the gas inlet passage 8 and providing gas.

As shown in FIGS. 1 to 14, a third aspect of the present invention provides a shielded pump comprising a pump body and a shielded motor connected to each other, wherein the pump body comprises the magnetic fluid sealed shaft assembly as provided in any one of the embodiments of the first aspect. In another embodiment, the third aspect of the present invention provides a shielded pump comprising a shielded motor provided in any one of the embodiments of the second aspect.

Here, in FIGS. 1 to 3 of the present application, the motor is a hermetically sealed motor with a separate fan, and the interior of the motor can be inflated with the natural air or an external gas source (nitrogen, air, etc.). In this structure, after the sealing of the magnetic fluid sealing device 3 fails, the liquid level rises and the gas in the outer gas blockage cavity 18 passes through the failed magnetic fluid sealing device 3 and into the upper motor cavity, and at the same time the medium also rises and flows through the magnetic fluid sealing device 3 and first into the gas cavity around the magnetic fluid. As the liquid level of the medium rises, the gas in the motor cavity is continuously compressed until the gas pressure in the motor cavity is equal to the medium pressure, thus forming an equilibrium, so that the liquid level will not rise again. (Since the motor cavity brings together the gas in the outer gas blockage cavity 18 and some or all of the gas in the cavity around the magnetic fluid sealing, so that the gas pressure in the motor cavity is considerably increased) since the design and arrangement of the space allows the liquid level to be equalized in the lower part of the motor coil, even if the magnetic fluid sealing fails, the medium does not rise to the position of the motor coil, thus ensuring that the motor is not damaged.

Of course, the motor may also be an ordinary motor (as shown in FIG. 4), or hermetic water-cooled motor (as shown in FIGS. 5 and 8).

In the case where the shielded pump provided according to embodiments of the present invention comprises a magnetic fluid sealed shaft assembly provided in any one of the embodiments of the first aspect, the pump may be a vertical pump such as a long-shaft submerged pump or a long-shaft deep well pump. In the case where the shielded pump comprises a shielded motor provided in any one of the embodiments of the second aspect, the pump body can be hermetically mounted directly to the end of the second casing away from the motor body, and the motor shaft can be connected to the rotating part of the pump body, so that the rotating part of the pump body can be driven to operate by the motor shaft. At the same time, a gas inlet passage 8 for inputting gas into the second casing can be provided on the second casing, and the outer end of the gas inlet passage 8 can be connected to the gas source. At this time, the lower end of the first accommodating cavity 12 is water-sealed by the pump body, so when gas is input into the second casing by the gas source, a gas blockage can be formed in the end of the second casing close to the shaft entry and exit hole, so that when the shielded motor is connected to the pump body, it is possible to prevent water in the pump body from entering the motor via the shaft entry and exit hole, which can ensure that the magnetic fluid sealing device 3 does not come into contact with the water, thus achieving waterproof protection for the magnetic fluid sealing device 3.

In the above shielded pump, as shown in FIGS. 1 to 12, the shielded pump is a vertical pump, and the shielded pump comprises a pump body, the magnetic fluid sealed shaft assembly is arranged vertically, the pump body is hermetically mounted to the lower end of the second casing, and the rotating shaft 2 is connected to the rotating part of the pump body. Preferably, as shown in FIG. 5 and FIG. 8, the shielded pump further comprises one or more waterproof protection devices, the waterproof protection devices comprising a water pressing sleeve 96 and a water retaining device 98, wherein the water pressing sleeve 96 is mounted between the rotating shaft 2 and the pump casing, and the water pressing sleeve 96 is provided with water pressing threads on the outer side wall, and during the arrangement, the rotation direction of the threads can be reasonably set by the rotation direction of the rotating shaft 2, so that when the rotating shaft 2 is rotating, the water flowing upwards along the rotating shaft 2 can be pressed downwards, thereby preventing the water from entering upwards into the second casing and coming into contact with the magnetic fluid sealing device 3. The water retaining device 98 is mounted on the rotating shaft 2 and located at the shaft entry and exit hole of the second casing, and the water flowing into the second casing rapidly can be retained by this water retaining device 98, thus avoiding the sudden impact of the water flow inside the pump body directly to the magnetic fluid sealing device 3, which causes the magnetic fluid sealing device 3 to be damaged by the water. After the water is retained by the water retaining device 98, the water entering the second casing can only slowly rise, and will not suddenly and quickly penetrate the barrier formed by the gas and contact with the magnetic fluid sealing device 3, so that the gas in the second casing can form a balance with the water pressure, thereby implementing effective gas blockage shielding for the magnetic fluid sealing device 3. Preferably, the water retaining device 98 is a water retaining plate or flared water retaining hood that is mounted on the rotating shaft 2 and has a preset axial distance from the magnetic fluid sealing device 3, with the opening of the flared water retaining hood facing upward.

In the description of this specification, the terms "connection", "mounting", "fixing", etc., are to be understood in a broad sense, for example, "connection" may be a fixed connection, and may also be a detachable connection, or a one-piece connection; and it may be a direct connection or an indirect connection through an intermediate medium. To a person of ordinary skill in the art, the specific meaning of the above terms in the present application can be understood according to the specific circumstances.

The above describes only the preferred embodiments of the present application, and is not intended to limit the present application, which is subject to various changes and variations for a person skilled in the art. Any modification, equivalent replacement, improvement, etc., made within the spirit and principles of the present application shall be included in the scope of protection of the present application.

What is claimed is:

1. A magnetic fluid sealed shaft assembly, comprising:
   a housing in which an accommodating cavity is provided, the accommodating cavity being provided with a fixed structure on an inner wall;
   a rotating shaft supported and mounted in the accommodating cavity;
   a magnetic fluid sealing device which is located in the accommodating cavity and is sleeve mounted on the rotating shaft, wherein the housing is provided with space for runout of the magnetic fluid sealing device following the rotating shaft and/or adjustment of a mounting angle and position according to a mounting state of the rotating shaft; and
   a resilient member which is hermetically connected to both the magnetic fluid sealing device and the fixed structure, wherein after the magnetic fluid sealing device is resiliently and hermetically connected to the fixed structure by the resilient member, the magnetic fluid sealing device is configured to runout following the rotating shaft and/or adjust the mounting angle and position according to the mounting state of the rotating shaft; wherein
   the fixed structure is provided on an inner side wall of the housing, or the fixed structure is mounted on an end portion structure located on the housing; and/or
   a radial spacing is provided between the magnetic fluid sealing device and the fixed structure, and an axial spacing is provided between the housing and two ends of the magnetic fluid sealing device; and
   the resilient member is a resilient connecting barrel that comprises a sleeve part and a mounting part, the sleeve part sleeving and being mounted on the magnetic fluid sealing device, and the mounting part being provided on the sleeve part and sealedly and fixedly connected to the fixed structure,
   wherein the sleeve part and the mounting part are of a one-piece structure, a radial spacing is provided between the sleeve part and the fixed structure, and an axial spacing is provided between the housing and two ends of the magnetic fluid sealing device.

2. The magnetic fluid sealed shaft assembly according to claim 1, wherein
   an outer gas blockage cavity is provided inside the housing and below the magnetic fluid sealing device, and the outer gas blockage cavity is configured to form a gas blockage after the bottom of the housing is sealed.

3. The magnetic fluid sealed shaft assembly according to claim 1, wherein
   the magnetic fluid sealed shaft assembly is of a vertical structure, and the housing comprises a first casing and a second casing sealedly connected to each other, wherein a shaft via hole is provided at the joint of the first casing and the second casing, the rotating shaft extends from the inside of the first casing into the second casing and extends out from the bottom of the second casing, and the magnetic fluid sealing device is mounted at the shaft via hole by means of the resilient member for use in sealing the shaft via hole;
   an outer gas blockage cavity is provided inside the second casing and below the magnetic fluid sealing device, and after the bottom of the second casing is sealed, the outer gas blockage cavity is configured to form a gas blockage, and gas required to form the gas blockage is natural air in the second casing in the outer gas blockage cavity, or the magnetic fluid sealed shaft assembly further comprises a gas inlet passage, wherein one end of the gas inlet passage is communicated with the interior of the second casing in the outer gas blockage cavity and the other end of the gas inlet passage is communicated with a gas source, and gas required to form the gas blockage comprises natural air in the second casing in the outer gas blockage cavity and gas input from the gas inlet passage.

4. The magnetic fluid sealed shaft assembly according to claim 3, wherein
   the magnetic fluid sealed shaft assembly further comprises a bearing body assembly for supporting and mounting the rotating shaft, the bearing body assembly being mounted in the housing and located on the upper side or the lower side of the magnetic fluid sealing device; and/or
   a lower end portion of the magnetic fluid sealing device is resiliently connected to the fixed structure by the resilient member, or an upper end portion of the magnetic fluid sealing device is resiliently connected to the fixed structure by the resilient member.

5. The magnetic fluid sealed shaft assembly according to claim 1, wherein
   the mounting part is an annular retaining ring provided on an outer side wall of the sleeve part along the circumferential direction of the sleeve part, wherein the annular retaining ring is located at a middle position of the sleeve part and is connected to the fixed structure by screws, and two ends of the sleeve part fixedly sleeve the magnetic fluid sealing device by at least two fastening members, or the annular retaining ring is provided at an end portion position of the sleeve part and is connected to the fixed structure by screws, and the other end portion position of the sleeve part is provided with an underpinning mounting part protruding inward from an inner side wall of the sleeve part, the underpinning mounting part being fixedly mounted to an end face of the magnetic fluid sealing device by screws, the annular retaining ring, the sleeve part, and the underpinning mounting part being of a one-piece structure, and the underpinning mounting part being provided with a through hole for the rotating shaft to pass through.

6. The magnetic fluid sealed shaft assembly according to claim 1, wherein the magnetic fluid sealing device is provided with a mating structure that is mounted in a mating manner to the fixed structure, and the resilient member comprises a first resilient ring provided between the mating structure and the fixed structure and/or a second resilient ring located on the side of the mating structure away from the fixed structure, wherein the fixed structure, the mating structure, the first resilient ring and/or the second resilient ring are secured by a fastener, and after the fixed structure, the mating structure, the first resilient ring and/or the second resilient ring are secured by the fastener, the mating structure is resiliently connected to the fixed structure, causing the magnetic fluid sealing device to be configured to runout following the rotating shaft and/or adjust the mounting angle and position according to the mounting state of the rotating shaft.

7. A magnetic fluid sealed shaft assembly, comprising:

a housing in which an accommodating cavity is provided, the accommodating cavity being provided with a fixed structure on an inner wall;

a rotating shaft supported and mounted in the accommodating cavity;

a magnetic fluid sealing device which is located in the accommodating cavity and is sleeve mounted on the rotating shaft, wherein the housing is provided with space for runout of the magnetic fluid sealing device following the rotating shaft and/or adjustment of a mounting angle and position according to a mounting state of the rotating shaft; and a resilient member which is hermetically connected to both the magnetic fluid sealing device and the fixed structure, wherein after the magnetic fluid sealing device is resiliently and hermetically connected to the fixed structure by the resilient member, the magnetic fluid sealing device is configured to runout following the rotating shaft and/or adjust the mounting angle and position according to the mounting state of the rotating shaft; wherein a radial spacing is provided between the fixed structure and the magnetic fluid sealing device, and the resilient member is a resilient connecting ring, a part of the resilient connecting ring being fixedly mounted on a first end portion of the magnetic fluid sealing device and the other part of the resilient connecting ring being fixedly mounted on the fixed structure; and a positioning structure is provided inside the housing and corresponding to a second end portion of the magnetic fluid sealing device, a cushion pad being provided between the positioning structure and the second end portion of the magnetic fluid sealing device.

8. The magnetic fluid sealed shaft assembly according to claim 7, wherein the fixed structure is a barrel-shaped structure that is mounted on an inner wall of the housing and is provided in the axial direction, the magnetic fluid sealing device is located inside the barrel-shaped structure and is provided with a radial spacing from the barrel-shaped structure, an inner side part of the resilient connecting ring is fixedly mounted on an end face of a first end of the magnetic fluid sealing device, and an outer side part of the resilient connecting ring is fixedly mounted on an end face of the barrel-shaped structure that corresponds to the end face of the first end of the magnetic fluid sealing device.

9. The magnetic fluid sealed shaft assembly according to claim 8, wherein a sealed first cooling cavity is enclosed among the resilient connecting ring, the magnetic fluid sealing device, the barrel-shaped structure, and the cushion pad, and the magnetic fluid sealed shaft assembly further comprises a first cooling medium channel with one end being sealedly communicated with the first cooling cavity and the other end of the first cooling medium channel being communicated with the outside of the housing.

10. A magnetic fluid sealed shaft assembly, comprising:

a housing in which an accommodating cavity is provided, the accommodating cavity being provided with a fixed structure on an inner wall;

a rotating shaft supported and mounted in the accommodating cavity;

a magnetic fluid sealing device which is located in the accommodating cavity and is sleeve mounted on the rotating shaft, wherein the housing is provided with space for runout of the magnetic fluid sealing device following the rotating shaft and/or adjustment of a mounting angle and position according to a mounting state of the rotating shaft; and a resilient member which is hermetically connected to both the magnetic fluid sealing device and the fixed structure, wherein after the magnetic fluid sealing device is resiliently and hermetically connected to the fixed structure by the resilient member, the magnetic fluid sealing device is configured to runout following the rotating shaft and/or adjust the mounting angle and position according to the mounting state of the rotating shaft;

wherein an outer gas blockage cavity is provided inside the housing and below the magnetic fluid sealing device, and the outer gas blockage cavity is configured to form a gas blockage after the bottom of the housing is sealed; and an inner gas blockage hood, wherein the inner gas blockage hood is mounted in the outer gas blockage cavity and hermetically connected to a lower end of the magnetic fluid sealing device along the axial direction, and the inner gas blockage hood is provided around the outer side of a part of the rotating shaft that extends into the outer gas blockage cavity, an inner gas blockage cavity is formed between the inner gas blockage hood and the rotating shaft, and after the bottom of the housing is sealed, the inner gas blockage cavity is configured to form a gas blockage.

11. The magnetic fluid sealed shaft assembly according to claim 10, wherein
an upper end of the inner gas blockage hood is provided with a mounting plate, and the resilient member is partially clamped and mounted between the mounting plate and a lower end portion of the magnetic fluid sealing device, or the resilient member is partially clamped and mounted between the mounting plate and the fixed structure.

12. The magnetic fluid sealed shaft assembly according to claim 1, wherein the magnetic fluid sealing device comprises:
a fixed sleeve;
a magnetic fluid sealing member, wherein the magnetic fluid sealing member is mounted in the fixed sleeve, and a sealed second cooling cavity is provided between an inner side wall of the fixed sleeve and an outer side wall of the magnetic fluid sealing member; and
a second cooling medium channel, one end of the second cooling medium channel being communicated with the second cooling cavity and the other end of the second cooling medium channel being communicated with the outside of the housing,
wherein the resilient member is sealedly mounted on the fixed sleeve and sealedly connected to the fixed structure.

13. A shielded motor, comprising:
a motor configuration assembly; and
the magnetic fluid sealed shaft assembly according to claim 1, wherein the rotating shaft of the magnetic fluid sealed shaft assembly is a motor shaft; and
the housing of the magnetic fluid sealed shaft assembly comprises a first casing and a second casing sealedly connected to each other, the first casing being a motor casing, and the motor configuration assembly being provided in the first casing,
wherein an output end of the motor shaft extends from the motor casing and is inserted into the second casing, and
the magnetic fluid sealing device of the magnetic fluid sealed shaft assembly is mounted in the motor casing or in the second casing.

14. A shielded pump, comprising:
a pump body and a shielded motor that are connected to each other, wherein the pump body comprises the magnetic fluid sealed shaft assembly according to claim 1.

15. A shielded pump, comprising;
a pump body and a shielded motor that are connected to each other, wherein the shielded motor is the shielded motor according to claim 13.

16. The magnetic fluid sealed shaft assembly according to claim 2, wherein the magnetic fluid sealing device comprises:
a fixed sleeve;
a magnetic fluid sealing member, wherein the magnetic fluid sealing member is mounted in the fixed sleeve, and a sealed second cooling cavity is provided between an inner side wall of the fixed sleeve and an outer side wall of the magnetic fluid sealing member; and
a second cooling medium channel, one end of the second cooling medium channel being communicated with the second cooling cavity and the other end of the second cooling medium channel being communicated with the outside of the housing,
wherein the resilient member is sealedly mounted on the fixed sleeve and sealedly connected to the fixed structure.

17. The magnetic fluid sealed shaft assembly according to claim 3, wherein the magnetic fluid sealing device comprises:
a fixed sleeve;
a magnetic fluid sealing member, wherein the magnetic fluid sealing member is mounted in the fixed sleeve, and a sealed second cooling cavity is provided between an inner side wall of the fixed sleeve and an outer side wall of the magnetic fluid sealing member; and
a second cooling medium channel, one end of the second cooling medium channel being communicated with the second cooling cavity and the other end of the second cooling medium channel being communicated with the outside of the housing,
wherein the resilient member is sealedly mounted on the fixed sleeve and sealedly connected to the fixed structure.

18. The magnetic fluid sealed shaft assembly according to claim 4, wherein the magnetic fluid sealing device comprises:
a fixed sleeve;
a magnetic fluid sealing member, wherein the magnetic fluid sealing member is mounted in the fixed sleeve, and a sealed second cooling cavity is provided between an inner side wall of the fixed sleeve and an outer side wall of the magnetic fluid sealing member; and
a second cooling medium channel, one end of the second cooling medium channel being communicated with the second cooling cavity and the other end of the second cooling medium channel being communicated with the outside of the housing,
wherein the resilient member is sealedly mounted on the fixed sleeve and sealedly connected to the fixed structure.

* * * * *